(12) United States Patent
Richardson

(10) Patent No.: US 7,146,572 B2
(45) Date of Patent: *Dec. 5, 2006

(54) SYSTEM AND METHOD FOR CONFIGURING DATABASE RESULT LOGGING FOR A TEST EXECUTIVE SEQUENCE

(75) Inventor: Scott Richardson, Austin, TX (US)

(73) Assignee: National Instruments Corporation, Austin, TX (US)

( * ) Notice: Subject to any disclaimer, the term of this patent is extended or adjusted under 35 U.S.C. 154(b) by 812 days.

This patent is subject to a terminal disclaimer.

(21) Appl. No.: 09/974,267

(22) Filed: Oct. 9, 2001

(65) Prior Publication Data

US 2003/0069876 A1 Apr. 10, 2003

(51) Int. Cl.
*G06F 7/00* (2006.01)
*G06F 17/30* (2006.01)

(52) U.S. Cl. ........................ 715/771; 718/100
(58) Field of Classification Search ............... 707/100, 707/105, 102, 10, 5, 30, 1, 3, 2; 345/772, 345/802, 747, 707–708; 715/771–773, 969, 715/970, 762, 764, 968, 780, 964–967, 746, 715/708; 714/33, 38; 718/100, 102, 103, 718/105, 104, 106, 107, 108; 717/128, 111; 702/119
See application file for complete search history.

(56) References Cited

U.S. PATENT DOCUMENTS

| | | | |
|---|---|---|---|
| 5,615,335 A * | 3/1997 | Onffroy et al. ............... 714/30 |
| 5,671,351 A * | 9/1997 | Wild et al. ..................... 714/38 |
| 5,892,949 A | 4/1999 | Noble |
| 5,903,146 A * | 5/1999 | Wang ....................... 324/158.1 |
| 5,991,537 A * | 11/1999 | McKeon et al. ............ 717/115 |
| 6,088,664 A * | 7/2000 | MacPherson ............... 702/183 |
| 6,128,759 A | 10/2000 | Hansen |
| 6,134,674 A * | 10/2000 | Akasheh ...................... 714/33 |
| 6,167,537 A | 12/2000 | Silva et al. |
| 6,397,378 B1* | 5/2002 | Grey et al. ................. 717/175 |
| 6,401,220 B1 | 6/2002 | Grey et al. |
| 6,408,403 B1* | 6/2002 | Rodrigues et al. ............ 714/38 |
| 6,473,707 B1* | 10/2002 | Grey .......................... 702/123 |

(Continued)

OTHER PUBLICATIONS

Johnson, Laura, "Test and Measurement—Understanding Test Executives," Webpage www.testandmeasurement.com.content/news/, Oct. 16, 2000, pp. 1-9.

*Primary Examiner*—Steven Sax
(74) *Attorney, Agent, or Firm*—Meyertons Hood Kivlin Kowert & Goetzel, P.C.; Jeffrey C. Hood; Jason L. Burgess

(57) ABSTRACT

A system and method for logging results for a test executive sequence to a database. The test executive software may be operable to receive user input to a graphical user interface (GUI) to specify desired database result logging criteria. In various embodiments, any of various result logging criteria may be specifiable. For example, the user input may specify a mapping of the results for the test executive sequence to the database tables. The user input may also specify criteria for limiting the amount of data logged to the database, e.g., by filtering the results that are logged in various ways. The test executive software may then log at least a portion of the execution results for the test executive sequence to a database, according to the specified result logging criteria.

36 Claims, 27 Drawing Sheets

U.S. PATENT DOCUMENTS

| | | | |
|---|---|---|---|
| 6,505,196 B1 * | 1/2003 | Drucker et al. | 707/5 |
| 6,507,842 B1 * | 1/2003 | Grey et al. | 707/5 |
| 6,577,981 B1 * | 6/2003 | Grey et al. | 702/119 |
| 6,618,753 B1 * | 9/2003 | Holland et al. | 709/217 |
| 6,622,298 B1 * | 9/2003 | Stamm | 717/125 |
| 6,643,798 B1 * | 11/2003 | Barton et al. | 714/25 |
| 6,710,893 B1 * | 3/2004 | Hou et al. | 358/1.15 |
| 6,829,733 B1 * | 12/2004 | Richardson et al. | 714/38 |
| 7,093,249 B1 * | 8/2006 | Melamed et al. | 718/100 |
| 2002/0196282 A1 * | 12/2002 | Washington et al. | 345/763 |
| 2004/0221238 A1 * | 11/2004 | Cifra et al. | 715/762 |

* cited by examiner

FIG. 4

| Column Name | Data Type | Description |
|---|---|---|
| ID | Primary Key | Unique value that identifies each entry in the table. For Access and SQL Server, the default process model assumes that this column increments automatically. For Oracle, the default process model uses an Oracle SQL sequence to generate a unique number. |
| STATION_ID | String | Station ID, usually the computer name. |
| BATCH_SERIAL_NUMBER | String | Serial number of the Batch. Only applies to executions that use the batch process model. |
| TEST_SOCKET_INDEX | Number | Test socket for the UUT. Only applies to executions that use the parallel or batch process models. |
| UUT_SERIAL_NUMBER | String | Serial number of the UUT. |
| USER_LOGIN_NAME | String | Login name of the user who tested the UUT. |
| START_DATE_TIME | Date-time | Time and date at which the UUT test began executing. |
| EXECUTION_TIME | Number | Number of seconds the UUT test took to execute. |
| UUT_STATUS | String | Status of the UUT test. |
| UUT_ERROR_CODE | Number | Error code, if the UUT test status is Error. |
| UUT_ERROR_MESSAGE | String | Error message, if the UUT test status is Error. |

| Column Name | Data Type | Description |
|---|---|---|
| ID | Primary Key | Unique value that identifies each entry in the table. For Access and SQL Server, the default process model assumes that this column increments automatically. For Oracle, the default process model uses an Oracle SQL sequence to generate a unique number. |
| UUT_RESULT | Foreign Key | UUT ID from the UUT_RESULT table that associates the step result with a UUT. |
| STEP_PARENT | Foreign Key | ID of the parent sequence call step result, if the step is a step in a subsequence. |
| STEP_NAME | String | Name of the step. |
| STEP_TYPE | String | Name of the step type. |
| STATUS | String | Status of the step. |
| REPORT_TEXT | String | Report text of the step. |
| ERROR_CODE | Number | Error code, if the step status is Error. |
| ERROR_MESSAGE | String | Error message, if the step status is Error. |
| MODULE_TIME | Number | Number of seconds the step module took to execute. |
| TOTAL_TIME | Number | Number of seconds the step took to execute, including module execution and all step options, such as preconditions, expressions, post-actions, and module loading. |
| NUM_LOOPS | Number | Number of loops the step executed, if any. |
| NUM_PASSED | Number | Number of loops the step returned a status of Passed, if any. |

| | | |
|---|---|---|
| NUM_FAILED | Number | Number of loops the step returned a status of Failed, if any. |
| ENDING_LOOP_INDEX | Number | The loop index after executing the ending loop. |
| LOOP_INDEX | Number | The value of the loop index for an iteration of the step. |
| INTERACTIVE_EXENUM | Number | Number that TestStand assigns to an interactive execution. The number is unique with respect to all other interactive executions in the current TestStand session. TestStand adds this property only if you run the step interactively. |
| STEP_GROUP | String | Step group that contains the step. The value is "Main", "Setup", or "Cleanup". |
| STEP_INDEX | Number | Zero-based position of the step in the step group. |
| ORDER_NUMBER | Number | The order in which the step executed within the execution. |

FIG. 15B

| Column Name | Data Type | Description |
| --- | --- | --- |
| ID | Primary Key | Unique value that identifies each entry in the table. |
| STEP_RESULT | Foreign Key | Step ID from the STEP_RESULT table that associates the result with a step. |
| EXIT_CODE | Number | The exit code of the executable. |

FIG. 16

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| BUTTON_PRESSED | Number | The button that was pressed. |
| RESPONSE | String | The response, if one exists. |

FIG. 17

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| PASS_FAIL | Boolean | If the step is a Pass/Fail step, whether the step passed or failed. |

FIG. 18

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| STRING_VALUE | String | The value of the string that the module returned. |
| STRING_LIMIT | String | The string against which TestStand compares the string that the module returns. |

FIG. 19

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| NUM_PROP_READ | Number | The number of property or variable values read from the file or database. |
| NUM_PROP_APPLIED | Number | The number of property or variable values applied from the file or database to the sequence file. |

FIG. 20

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| SEQUENCE_NAME | String | The name of the sequence that was called. |
| SEQUENCE_FILE_PATH | String | The path to the sequence file. |

FIG. 21

| Column Name | Data Type | Description |
| --- | --- | --- |
| ID | Primary Key | Unique value that identifies each entry in the table. |
| STEP_RESULT | Foreign Key | Step ID from the STEP_RESULT table that associates the result with a step. |
| NAME | String | The name of the measurement. |
| COMP_OPERATOR | String | The comparison operator for the step. |
| HIGH_LIMIT | Number | The high limit for the step comparison. |
| LOW_LIMIT | Number | The low limit for the step comparison. |
| UNITS | String | A label that describes the units for the measurement. |
| DATA | Number | The value of the numeric measurement that the module returned. |
| STATUS | String | The status of the numeric limit comparison. |

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| TYPE | Number | The type of measurement. |
| CHANNEL | String | The channel name for the measurement. |
| DATA | Number | The value of the numeric measurement that the module returned. |

| Column Name | Data Type | Description |
| --- | --- | --- |
| ID | Primary Key | Unique value that identifies each entry in the table. |
| STEP_RESULT | Foreign Key | Step ID from the STEP_RESULT table that associates the result with a step. |
| TYPE | Number | The type of measurement. |
| CHANNEL | String | The channel for the step comparison. |
| INITIALX | Number | The offset to the first point in the waveform. |
| DELTAX | Number | The offset between the points in the waveform. |
| DATA | Binary | The waveform for the numeric measurement that the module returned. |

FIG. 24

| Column Name | Data Type | Description |
|---|---|---|
| ID | Primary Key | Unique value that identifies each entry in the table. |
| STEP_RESULT | Foreign Key | Step ID from the STEP_RESULT table that associates the result with a step. |
| TYPE | Number | The type of measurement. |
| CHANNEL | String | The channel name for the measurement. |
| INITIALX | Number | The offset to the first point in the waveforms. |
| DELTAX | Number | The offset between the points in the waveforms. |
| DATA0 | Binary | The first waveform for the numeric measurement that the module returned. |
| DATA1 | Binary | The second waveform for the numeric measurement that the module returned. |

FIG. 25

SYSTEM AND METHOD FOR CONFIGURING DATABASE RESULT LOGGING FOR A TEST EXECUTIVE SEQUENCE

FIELD OF THE INVENTION

The present invention relates to the field of test executive software for organizing and executing test executive sequences. In particular, the invention relates to a system and method for configuring database result logging for a test executive sequence using a graphical user interface (GUI).

DESCRIPTION OF THE RELATED ART

Test executive software is specialized software that allows a user to organize and execute sequences of reusable test modules to test units under test (UUTs). For example, the test modules may interact with one or more hardware instruments to test the UUT(s). The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature, as used herein:

Code Module—A program module, such as a Windows Dynamic Link Library (.dll), LabVIEW VI (.vi), ActiveX component, or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of a system or UUT.

In executing the test executive sequence to perform tests of the system or UUT, a set of results is typically produced. Users often desire to log the results for the test executive sequence to a database. Some prior art test executive systems have provided limited support for test executive sequence result logging, but these solutions have proved to be either too inflexible or too difficult to use for many users.

For example, the database logging solution for the TestStand 1.0 test executive system from National Instruments Corp. was implemented by a separate result logging sequence that included steps to log results for a test executive sequence to a database. To change aspects of the result logging, e.g., in order to customize the mapping of results to columns in the database, users were required to edit this result logging sequence. However, to make the desired changes, it was necessary for users to understand the operation of the result logging sequence, and many users found this to be difficult and/or time-consuming.

It would be desirable to instead enable a test executive system to display a specialized user-friendly graphical user interface (GUI) that the user could interact with to configure the desired database result logging for a test executive sequence. The GUI would not only allow the user to more easily specify the desired database result-logging configuration, but would preferably also provide features enabling a high degree of customization of the result logging performed by the test executive system. For example, it would be desirable to enable the user to utilize the GUI to customize the mapping of results to columns in the database, specify filtering criteria to filter which results are logged to the database, etc.

SUMMARY OF THE INVENTION

One embodiment of the present invention comprises a system and method for logging results for a test executive sequence to a database. A computer system may execute a test executive sequence under control of test executive software, wherein the test executive sequence is operable to test a unit under test (UUT). For example, the test executive sequence may include various steps referencing code modules operable to analyze or measure the UUT, e.g., by interfacing with the UUT through one or more devices or instruments.

In testing the UUT, various results of the execution of the test executive sequence may be collected by the test executive software. For example, as the results are generated, the results may be stored in one or more data structures. In various embodiments, the results may be generated or structured in any of various ways. For example, in one embodiment, there may be one or more results for the unit under test (UUT) as a whole, as well as results for individual steps in the sequence. The results may vary in data type as well.

The test executive software may be operable to receive user input to a graphical user interface (GUI) to specify desired database result logging criteria. The test executive software may then log at least a portion of the execution results for the test executive sequence to a database, according to the specified result logging criteria.

According to one embodiment of the method, one or more database tables may first be created. The database tables may be associated with a database of any kind and may comprise one or more columns, such as are well known in the art. The database tables may be used to persistently store execution results for a test executive sequence. In one embodiment, default database tables may be created by the test executive software, e.g., at installation time or by executing a script provided by the test executive software. In another embodiment, the user may be able to modify default tables and/or create new tables.

The graphical user interface (GUI) for specifying criteria for logging results for a test executive sequence to the database tables may then be displayed. For example, the GUI may be displayed in response to the user requesting, e.g., via a menu item, to specify result logging criteria. In various embodiments, the GUI may be a GUI of any kind. For example, the GUI may comprise a dialog or window, such as used in window-based user interface systems. In the preferred embodiment, the GUI is specialized for receiving result logging criteria for a test executive sequence and enables the user to specify the criteria easily and efficiently. It is noted that the GUI may not necessarily be a single window, but may comprise multiple windows or tabs.

User input specifying the desired result logging criteria may then be received to the GUI. In various embodiments, any of various result logging criteria may be specifiable. For example, the user input may specify a mapping of the results for the test executive sequence to the database tables. The user input may also specify criteria for limiting the amount of data logged to the database, e.g., by filtering the results that are logged in various ways. For example, the results may also be filtered based on data types of the results. The results may also be filtered based on properties that must exist before the test executive logs the results.

The results may also be filtered based on step types of the steps to which the results correspond. For example, the GUI may allow the user to specify different result logging criteria for steps of different step types. As one example, the user may specify a precondition expression for a first step type, wherein the precondition expression must evaluate to True before the test executive logs results for steps of the first step type. For a second step type, the user may not specify a precondition expression or may specify a different expression. As another example, the user may specify a set of expected properties for a first step type, wherein the expected properties must exist before the test executive logs results for steps of the first step type. For a second step type, the user may not specify any expected properties or may specify a different set of expected properties.

In one embodiment, the result logging criteria may be divided into multiple "statements". Each statement may comprise filtering criteria that specify a subset of the results for the test executive sequence, as well as criteria specifying how the subset of results should be mapped or logged to the database tables. Thus, the result logging performed by the test executive system may be viewed as a type of pattern matching, in that the entire result set is examined for results that match the filtering criteria of the statements. For the results to which each statement applies, those results are logged to the database or otherwise processed.

Thus, logging the results to the database according to the specified result logging criteria may comprise applying the one or more statements to the results. For the result subset to which a particular statement applies, the statement may operate on the result subset in various ways. For example, in one embodiment, a mapping of results in the result subset to columns in the database tables may be specified, and the test executive system may automatically log the result subset to the database according to this mapping. In another embodiment, the user may specify a SQL command to apply to the result subset, such as a SQL INSERT command to insert the results in the result subset into the desired tables and columns. In another embodiment, the user may specify a stored procedure of the database to apply to the result subset.

The statements may be applied to the results at various times relative to execution of the test executive sequence. For example, in one embodiment, the statements may be applied after the sequence has finished execution, when all the results have been collected. Thus, no results may be logged until the sequence finishes execution. In another embodiment, the statements may be applied during execution of the sequence. For example, after a step executes and results for the step have been collected, the statements may be applied to the results for the step. Thus, step results may be logged in parallel with execution of the sequence.

After the desired result logging criteria have been specified, a test executive sequence may be executed. Executing the test executive sequence may comprise executing test executive steps in the test executive sequence. As described above, various results for the test executive sequence may be collected as the sequence executes. The results for the test executive sequence may be logged to or stored in the database tables according to the specified result logging criteria.

Each result may have multiple fields or sub-results. For example, a result for a step may have a field indicating the amount of time it took to execute the step, a field indicating the amount of time it took to execute an external code module called by the step, a field indicating the number of times the step was executed, a field indicating a result status for the step (e.g., Pass or Fail), a field indicating an error message for the step, etc. Also, a result for a step may have multiple sub-results corresponding to multiple measurements performed by the step. In one embodiment, for a result with multiple fields or sub-results, only a subset of the fields or sub-results may be logged to the database, depending on the specified result logging criteria.

Also, the results may include values that are not strictly determined by executing the test executive sequence. For example, a result for a step may have a field indicating the name of the step and/or a field indicating the name of the step type.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a test executive application;

FIGS. 14–25 illustrate default database tables used by the TestStand test executive application to log results for a test executive sequence.

Figure 1:
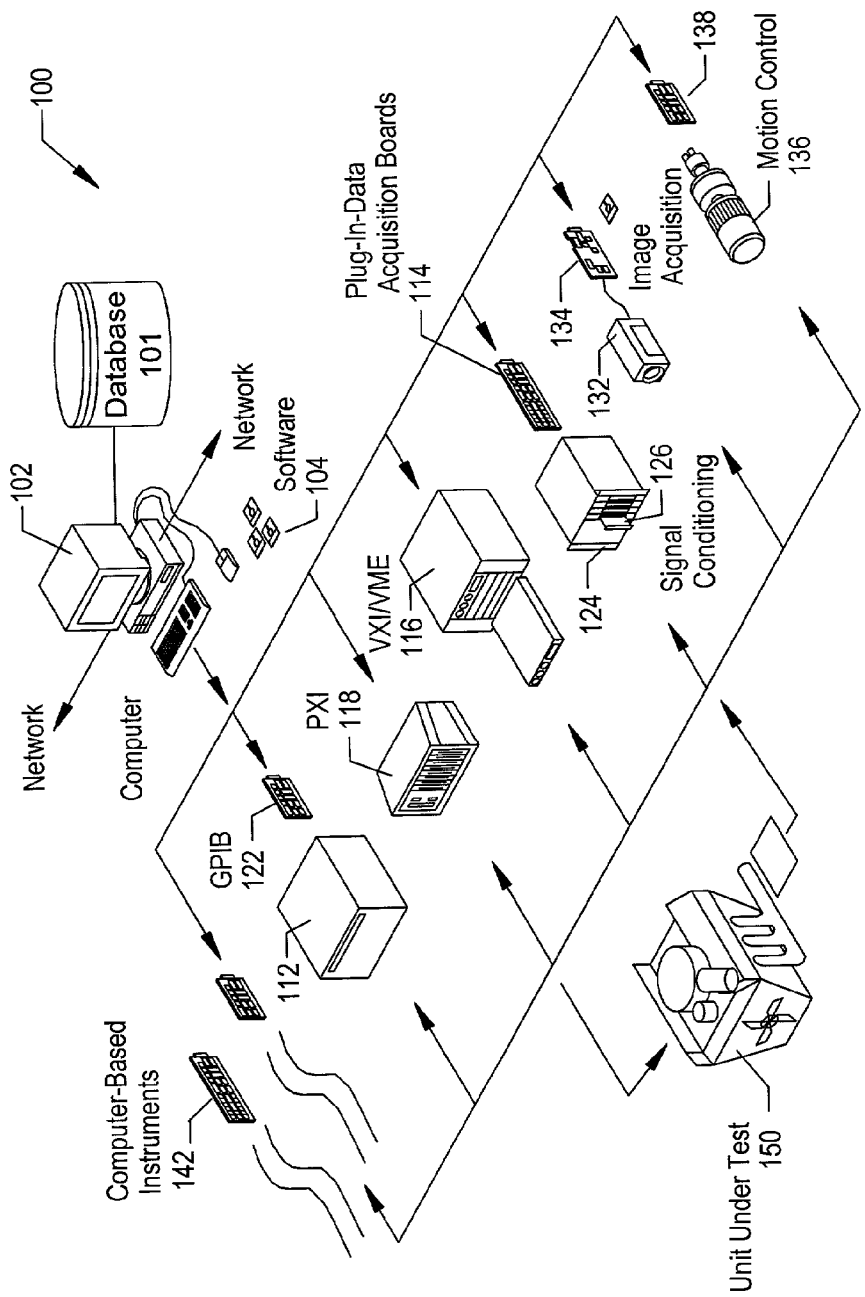
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

FIG. 1—Instrumentation System

FIG. 1 illustrates an exemplary instrumentation control system 100. The system 100 comprises a host computer 102 that connects to one or more instruments. The host computer 102 comprises a CPU, a display screen, memory, and one or more input devices such as a mouse or keyboard as shown. The computer 102 may execute a test executive sequence operable to analyze, measure, and/or control a unit under test (UUT) or process 150. For example, the test executive sequence may include various steps referencing code modules operable to connect through the one or more instruments to analyze, measure, or control the unit under test (UUT) or process 150. It is noted that FIG. 1 is exemplary only, and the present invention may be used in conjunction with any of various systems, as desired.

As shown in FIG. 1, the system 100 may also include a database 101. The computer 102 may interface with the database 101 to log execution results for a test executive sequence. The database 101 may be a database of any type. In the preferred embodiment, the database 101 supports database tables having columns and rows, such as are well known in the art. In one embodiment, the database 101 may be located or stored on a separate computer system from the computer 102. For example, the computer 102 may communicate with a separate computer, e.g., a database server computer, via a network. In another embodiment, the database 101 may be located on the computer 102 itself.

The one or more instruments in the system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 may include a memory medium on which test executive software according to one embodiment of the present invention is stored. The test executive software may allow a user to create or configure a test executive sequence, and/or control test executive sequence execution for various test applications, such as production and manufacturing test applications. For example, the test executive sequence may be operable to perform one or more tests of the unit under test (UUT) or process 150.

In testing the UUT or process 150, various results of the execution of the test executive sequence may be collected by the test executive software. As described in detail below, the test executive software may be operable to receive user input to a graphical user interface (GUI) to specify desired database result logging criteria. The test executive software may then log at least a portion of the execution results for the test executive sequence to the database 101, according to the specified result logging criteria.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The host computer CPU executing code and data from the memory medium may comprise a means for implementing the methods described below.

Figure 2:
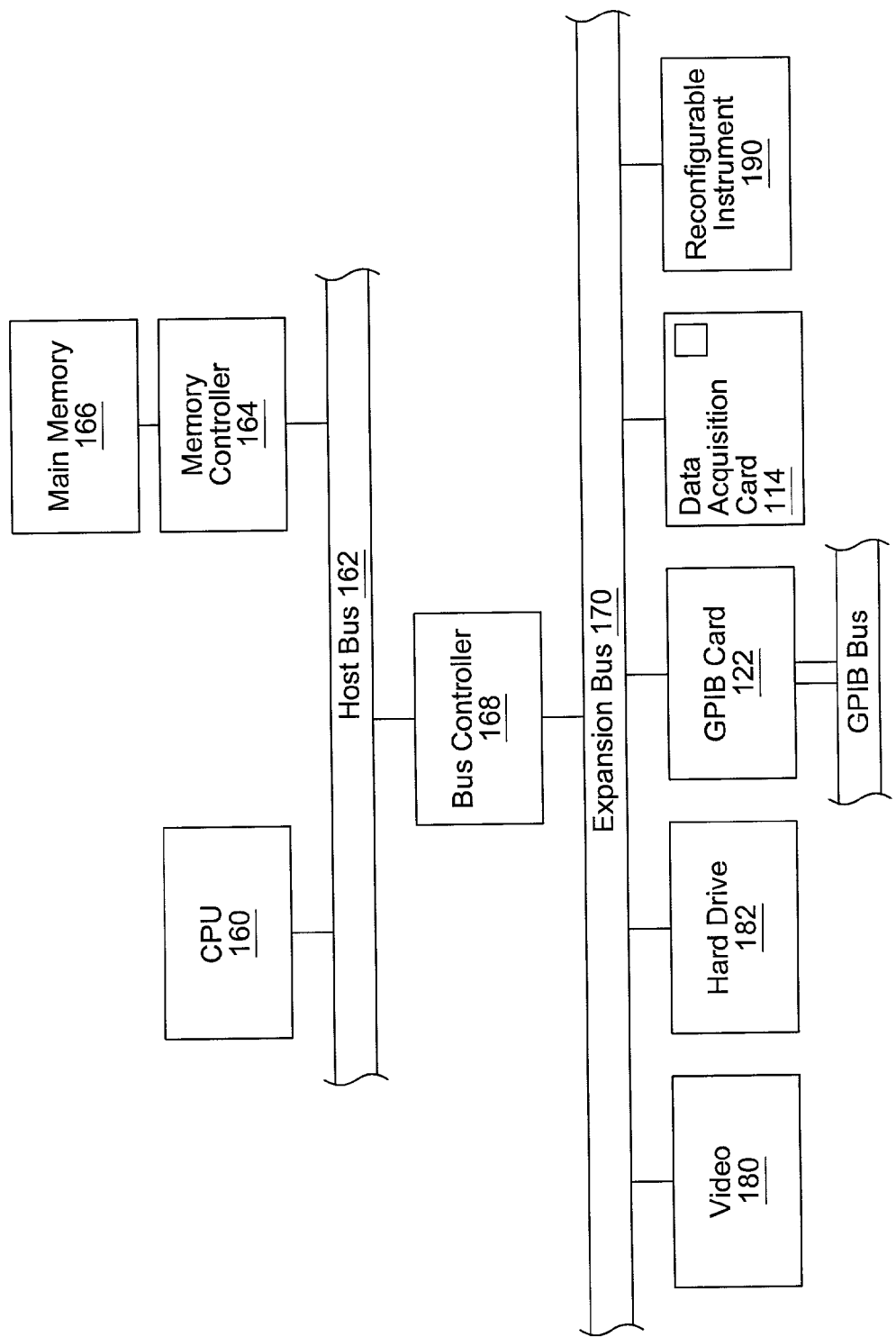
FIG. 2 is a block diagram of the computer system of FIG. 1.

FIG. 2—Computer System Block Diagram

FIG. 2 is a block diagram of the computer system 102 illustrated in FIG. 1. It is noted that any type of computer system configuration or architecture can be used as desired, and FIG. 2 illustrates a representative PC embodiment. It is also noted that the computer system may be a general purpose computer system such as shown in FIG. 1, a computer implemented on a VXI card installed in a VXI chassis, a computer implemented on a PXI card installed in a PXI chassis, or other types of embodiments. Elements of a computer not necessary to understand the present disclosure have been omitted for simplicity.

The computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, such as test executive software with functionality as described above with reference to FIG. 1. The main memory 166 may also store operating system software, as well as other software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1) and a GPIB interface card 122 that provides a GPIB bus interface to the GPIB instrument 112 (of FIG. 1). The computer 102 further comprises a video display subsystem 180 and hard drive 182 coupled to the expansion bus 170.

As shown, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the test executive software described herein may execute on the reconfigurable instrument 190. In various embodiments, the functional unit may be comprised on an instrument or device connected to the computer through means other than an expansion slot, e.g., the instrument or device may be connected via an IEEE 1394 bus, USB, or other type of port. Also, the functional unit may be comprised on a device such as the data acquisition board 114 or another device shown in FIG. 1.

Test Executive Software Components

Figure 3:
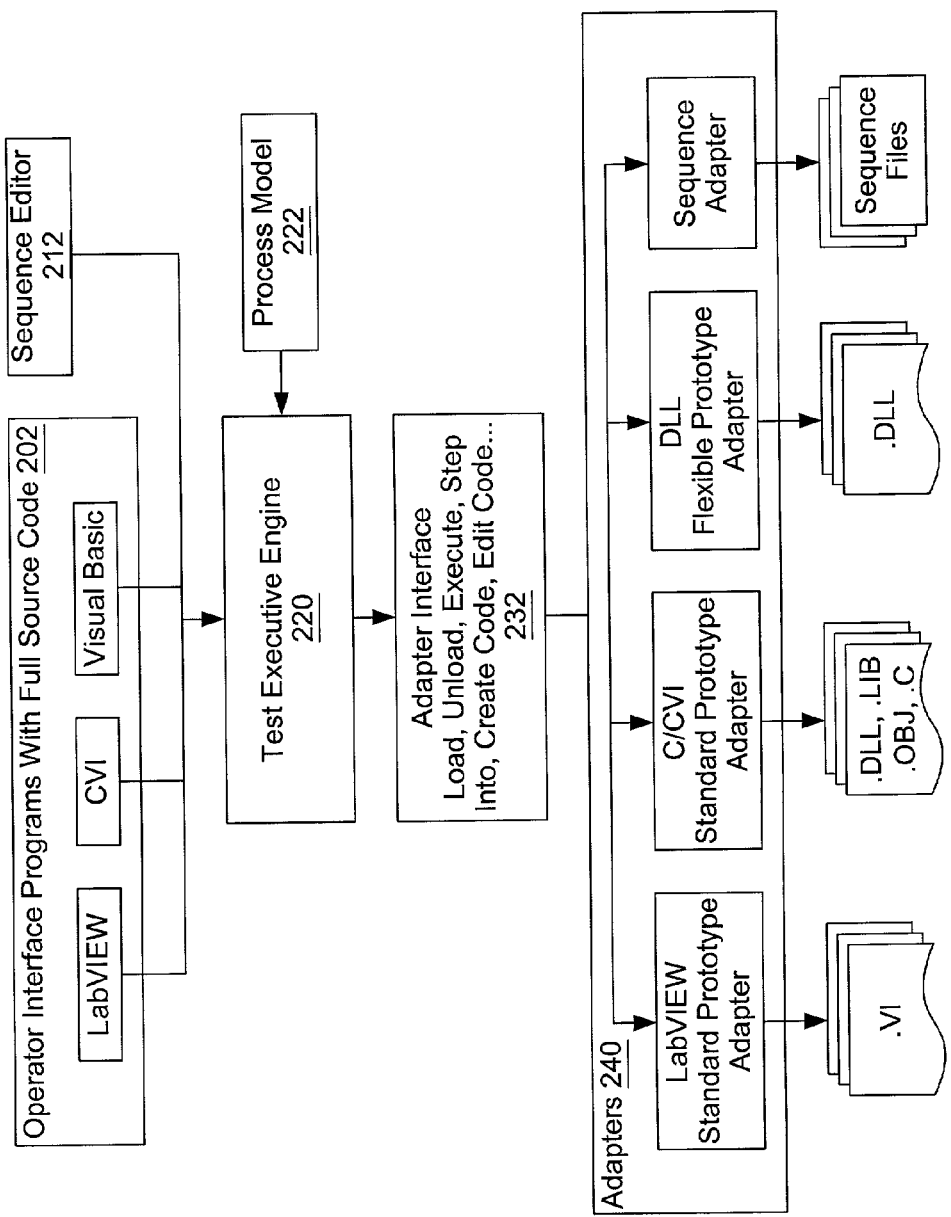
FIG. 3 illustrates a test executive application software architecture according to one embodiment of the present invention.

FIG. 3 is a block diagram illustrating high-level architectural relationships between elements of one embodiment of a test executive software application. It is noted that FIG. 3 is exemplary, and the present invention may be utilized in conjunction with any of various test executive software applications or architectures. In one embodiment, the elements of FIG. 3 are comprised in the TestStand test executive product from National Instruments. As shown, the test executive software of FIG. 3 includes operator interface programs 202 for interfacing to various software programs. The operator interface programs 202 shown in FIG. 3 are for creating operator interface programs using the LabVIEW, LabWindows/CVI, and Visual Basic application development environments. However, additional operator interface programs 202 may be included for development with other application development environments.

The test executive software of FIG. 3 also includes a sequence editor 212 for creating and editing test executive sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 3 include the LabVIEW standard prototype adapter, the C/CVI prototype adapter, the DLL flexible prototype adapter, and the sequence adapter. The LabVIEW standard prototype adapter interfaces to program modules having a .VI extension, i.e., LabVIEW graphical programs. The C/CVI prototype adapter interfaces to program modules having a .dll, .lib, .obj, or .c extension. The DLL flexible prototype adapter interfaces to program modules having a .dll extension. The sequence adapter interfaces to sequence files.

The test executive engine 220 manages the execution of test executive sequences. Sequences comprise steps that may call external or user-supplied code modules. By using module adapters 240 that have the standard adapter interface 232, the test executive engine 220 can load and execute different types of code modules. Thus, the test executive may be independent from particular application development environments (ADEs) used to create the code modules. In one embodiment, the test executive may use a special type of sequence called a process model to direct the high-level sequence flow. The test executive engine 220 may implement an API used by the sequence editor 212 and run-time operator interfaces 202.

Test Executive Sequence Editor

The sequence editor 212 may be an application program in which the user creates, modifies, and/or debugs test executive sequences. The sequence editor 212 may have a graphical user interface (GUI) enabling a user to efficiently create a test executive sequence for testing a system or unit under test. For example, the sequence editor 212 may provide the user with easy access to test executive features, such as step types, step properties, sequence parameters, step result collection, etc.

Figure 4:
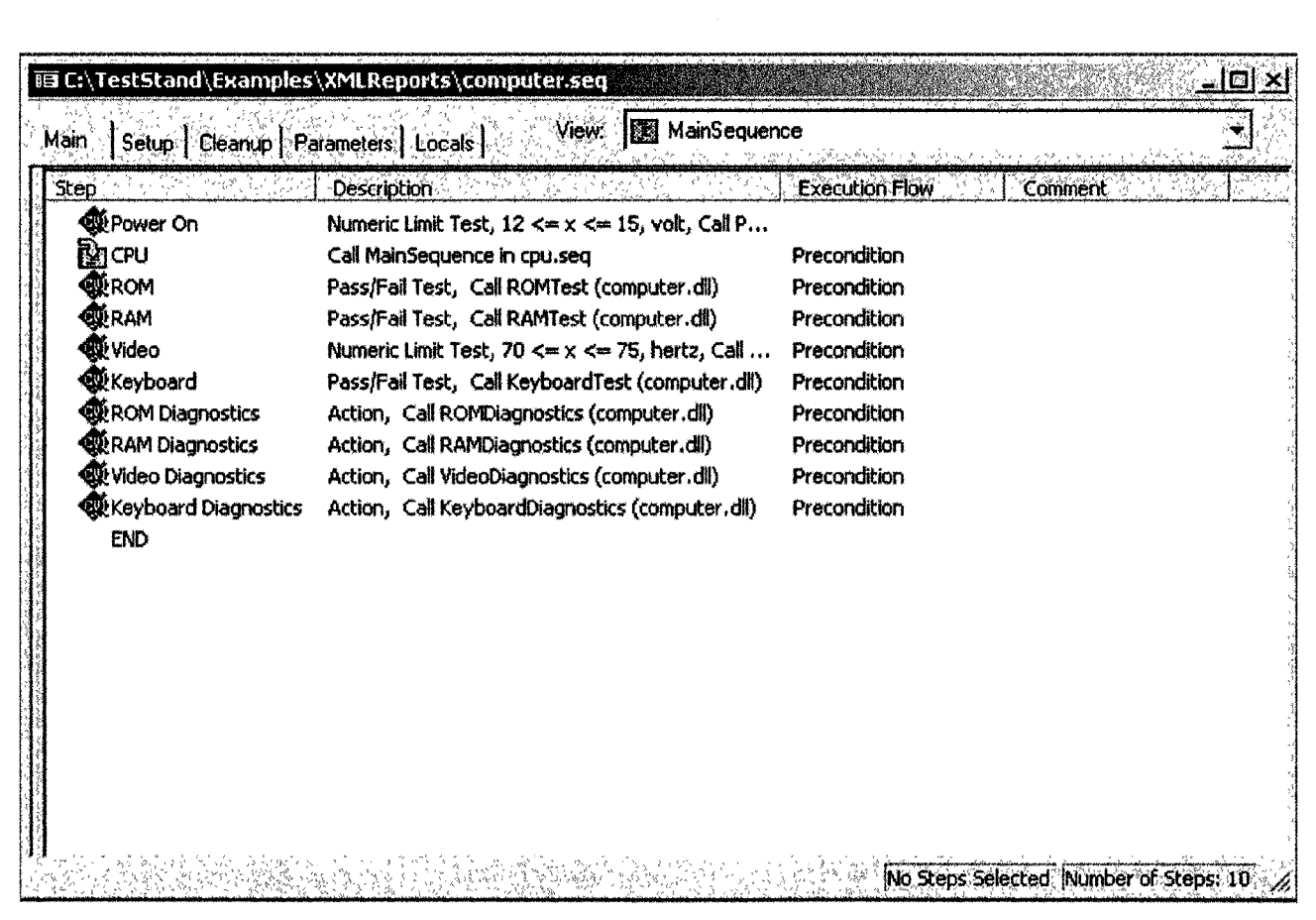
Figure 5:
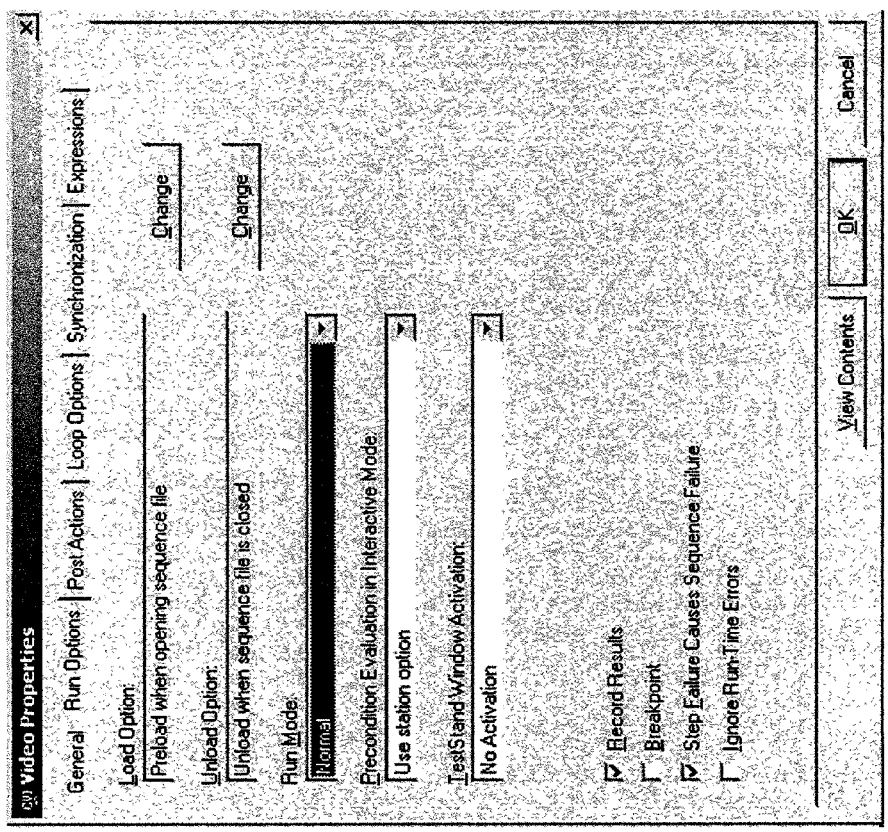
FIG. 5 illustrates an exemplary dialog box for a test executive step, which enables the user to specify various properties for the step that affect the way the test executive software manages the execution of the step.

FIG. 4 illustrates one example of a test executive sequence, created according to one embodiment of a sequence editor 212. The exemplary sequence of FIG. 4 comprises a plurality of test executive steps operable to test various aspects of a computer system. For example, the sequence includes a "ROM" step to test the computer's read-only memory, a "RAM" step to test the computer's random access memory, etc. Each step may call a user-supplied code module that interacts with the computer system to perform the desired test. The user may also specify various properties for each step that affect the way the test executive software manages the execution of the step. For example, FIG. 5 illustrates an exemplary dialog box for the "Video" step. As shown, a "Run Options" property page is selected in FIG. 5. The "Run Options" property page enables the user to specify various options for the step, such as whether to collect test results for the step, whether to break execution when the step is reached, whether to pre-load the step when opening the sequence file, etc.

In one embodiment, the sequence editor 212 may also include an execution window that provides debugging tools, e.g., those found in application development environments such as LabVIEW, LabWindows/CVI, Microsoft Visual C/C++, Microsoft Visual Basic, etc. These may include features such as breakpoints, single stepping, tracing, a variable display, and a watch window.

In one embodiment, in the sequence editor 212, the user may start multiple concurrent executions. Multiple instances of the same sequence can be executed, and different sequences can be executed at the same time, e.g., as separate threads in a multithreaded system. Each execution instance may have its own execution window. In trace mode, the execution window may display the steps in the currently executing sequence. When execution is suspended, the execution window may display the next step to execute and provide single-stepping options.

Test Executive Engine

The test executive engine 220 may be used when creating, editing, executing, and debugging test executive sequences. The test executive engine 220 may also provide a test executive engine application programming interface (API) that enables another program to interface with the test executive engine 220 in order to perform these actions. In one embodiment, the test executive engine 220 may export an object-based or component-based API, which in one embodiment may be an ActiveX Automation API. The sequence editor 212 and run-time operator interfaces 202 may use the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from test modules written in various programming environments, including test modules that are written in LabVIEW, LabWindows/CVI, Microsoft Visual C++, Microsoft Visual Basic, Java, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on execution results of previous steps.

For a step that references a user-supplied code module, executing the step may comprise executing the respective code module. In addition to these user-supplied code modules being executed, for each step, additional program instructions may be executed, wherein these additional program instructions implement additional functionality specified for the step. These additional program instructions may be specified by the test executive software, rather than being defined by the respective user-supplied code module for the step. As one example, when including a step in a sequence, the user may configure execution results of the step to be collected. In this example, when the step is executed, program instructions to store the step results accordingly may be executed in addition to the program instructions of a user-supplied code module that the step references.

It is noted that not all steps may reference a user-supplied code module. For example, the test executive may provide some step types that primarily affect various aspects of sequence execution and are not designed to reference user-supplied code modules.

As a test executive sequence is executed, various results may be generated, and these results may be collected, e.g., may be stored in one or more data structures. In various embodiments, the results may be generated or structured in any of various ways. For example, in one embodiment, there may be one or more results for the unit under test (UUT) as a whole, as well as results for individual steps in the sequence. The results may vary in data type as well.

Variables and Properties

In one embodiment, the test executive system may support the use of variables and/or "properties". As used herein, variables and properties comprise locations in which data can be stored. Each step in a test executive sequence may have properties. For example, a step might have an integer error code property. The type of a step may determine the set of properties which are included in the step. Step types are discussed below.

Values that are stored in variables and properties can be passed to code modules. The test executive API may be useable to access variable and property values directly from code modules. For example, when executing sequences, the test executive may maintain a "sequence context" that contains references to variables and step properties in active sequences. The contents of the sequence context may change depending on the currently executing sequence and step. If the user passes a sequence context object reference to the code module, the test executive API can be used to access the variables and properties in the sequence context.

The values of variables and properties can be used in numerous ways, such as using a property value to determine whether to execute a step. Sometimes the user desires to use an "expression", which is a formula that calculates a new value from the values of multiple variables or properties. An expression can be used anywhere a simple variable or property value is used. In expressions, the user can access all variables and properties in the sequence context that is active when TestStand evaluates the expression. The following is an example of an expression:

Locals.MidBandFrequency=(Step.HighFrequency+
   Step.LowFrequency)/2

The test executive may support applicable expression operators and syntax that are used in programming languages such as C, C++, Java, Visual Basic, etc.

Categories of Properties

As described above, a property comprises a container of information. A property can contain a single value, an array of values of the same type, or no value at all. A property can also contain any number of sub-properties. Each property has a name. A value may have a data type, such as a Number, a String, a Boolean, etc. In one embodiment, the following categories of properties may be supported:

A "single-valued" property contains a single value, such as a Number, String, or Boolean value, etc.

An "array" property contains an array of values. There may be Number Array properties, String Array properties, Boolean Array properties, etc.

A "property-array" property contains a value that is an array of sub-properties. In addition to the array of sub-properties, property-array properties can contain any number of sub-properties of other types.

An "object" property contains no values. Typically, object properties contain multiple sub-properties. Object properties are analogous to structures in C/C++ and to clusters in LabVIEW.

Standard and Custom Named Data Types

When the user creates a variable or property, the user specifies its data type. In some cases, a simple data type such as a Number or a Boolean is used. In other cases, the user can define his/her own data type, by creating a named data type, in which sub-properties are added to create an arbitrarily complex data structure. When a named data type is created, the user can reuse the named data type for multiple variables or properties. Although each variable or property that the user creates with a named data type has the same data structure, the values they contain can differ.

The test executive may define certain standard named data types, such as Path, Error, and CommonResults.

The user can define his/her own custom named data types. The user must choose a unique name for each of the custom data types. Sub-properties in each custom data type can be added or deleted without restriction. For example, the user might create a "Transmitter" data type that contains sub-properties such as "NumChannels" and "Power Level".

When the user creates a variable or property, the user can select from among the simple property types and the named data types.

Built-In and Custom Properties

In one embodiment, the test executive may define various properties that are always present for objects such as steps and sequences. An example is a step "run mode" property. Such properties are referred to as built-in properties. The user can define new properties in addition to the built-in properties. Examples are high and low limit properties in a step or local variables in a sequence. Such properties are referred to as custom properties.

Steps

As described above, a test executive sequence comprises a plurality of steps. A step can do many things, such as initializing an instrument, performing a complex test, or making a decision that affects the flow of execution in a sequence. Steps can perform these actions through several types of mechanisms, including jumping to another step, executing an expression, calling a sub-sequence or calling an external code module. The term "step module" is used to refer to the code module that a step calls.

Steps can have custom properties. For steps that call code modules, custom step properties are useful for storing parameters to pass to the code module for the step. They also serve as a place for the code module to store its results. The test executive API can be used to access the values of custom step properties from code modules.

Not all steps call code modules. Some steps perform standard actions that the user configures using a dialog box. In this case, custom step properties are useful for storing the configuration settings that the user specifies.

Built-In Step Properties

Steps may have a number of built-in properties that the user can specify. Exemplary built-in step properties include:

Preconditions that allow the user to specify the conditions that must be true for the test executive to execute the step during the normal flow of execution in a sequence.

Load/Unload Options that allow the user to specify when the test executive loads and unloads the code modules or subsequences that each step invokes.

Run Mode that allows a step to be skipped or forced to pass or fail without executing the step module.

Record Results that allows the user to specify whether the test executive collects the results of the step.

Step Failure Causes Sequence Failure that allows the user to specify whether the test executive sets the status of the sequence to "Failed" when the status of the step is "Failed".

Ignore Run-Time Errors that allows the user to specify whether the test executive continues execution normally after the step even though a run-time error occurs in the step.

Post Actions that allows the user to specify the execution of callbacks or jump to other steps after executing the step, depending on the pass/fail status of the step or any custom condition.

Loop options that allow the user to cause a single step to execute multiple times before executing the next step. The user can specify the conditions under which to terminate the loop. The user can also specify whether to collect results for each loop iteration, for the loop as a whole, or for both.

Pre Expression that allows the user to specify an expression to evaluate before executing the step module.

Post Expression that allows the user to specify an expression to evaluate after executing the step module.

Status Expression that allows the user to specify an expression to use to set the value of a "status" property of the step automatically.

Step Types

In one embodiment, the test executive system may support the use of "step types". In a test executive sequence having a number of steps, in many instances the user will desire a number of steps that have some commonality of functionality and/or properties. Thus, a step type may be implemented to define common properties and/or operations associated with a plurality of steps, thereby eliminating the need for the user to define these common properties and/or operations for each of the respective steps. Step instances of the step type incorporate this common functionality and/or properties from the step type, and thus the user is not required to hard code that functionality and/or properties in each instance or step.

In one embodiment, step types may define common functionality by defining pre and post sub-steps. When a first step in a test executive sequence of a given step type is executed, the pre and post sub-steps may execute before and after, respectively, the first step. Step types may also include pre and post expressions and status expressions for configurability, which may be executed at runtime.

A step type may have similar functionality to a type definition, in that once the user has configured a step type and created steps of that step type in a sequence, if the user later changes that step type, those changes may propagate through all of the steps which are based on that step type. In one embodiment, this functionality is not performed by copying or propagating changes. Rather, the information may be held within the step type, and during runtime the sequence may examine the step type to determine proper execution of a step of that step type.

As one example of a step type, a "Numeric Limit Test" step type may be defined. Steps of this step type may call a code module that returns a single measurement value. After the code module executes, the Numeric Limit Test step type may compare the measurement value to predefined limits. If the measurement value is within the bounds of the limits, the step type may set a status value for the step to "Passed". Otherwise, the status value may be set to "Failed".

As described above, the user may interact with a GUI to specify result logging criteria for results for a test executive sequence. In one embodiment, the GUI may allow the user to specify different result logging criteria for steps of different step types. As one example, the user may specify a precondition expression for a first step type, wherein the precondition expression must evaluate to True before the test executive logs results for steps of the first step type. For a second step type, the user may not specify a precondition expression or may specify a different expression. As another example, the user may specify a set of expected properties for a first step type, wherein the expected properties must exist before the test executive logs results for steps of the first step type. For a second step type, the user may not specify any expected properties or may specify a different set of expected properties.

Figure 6:
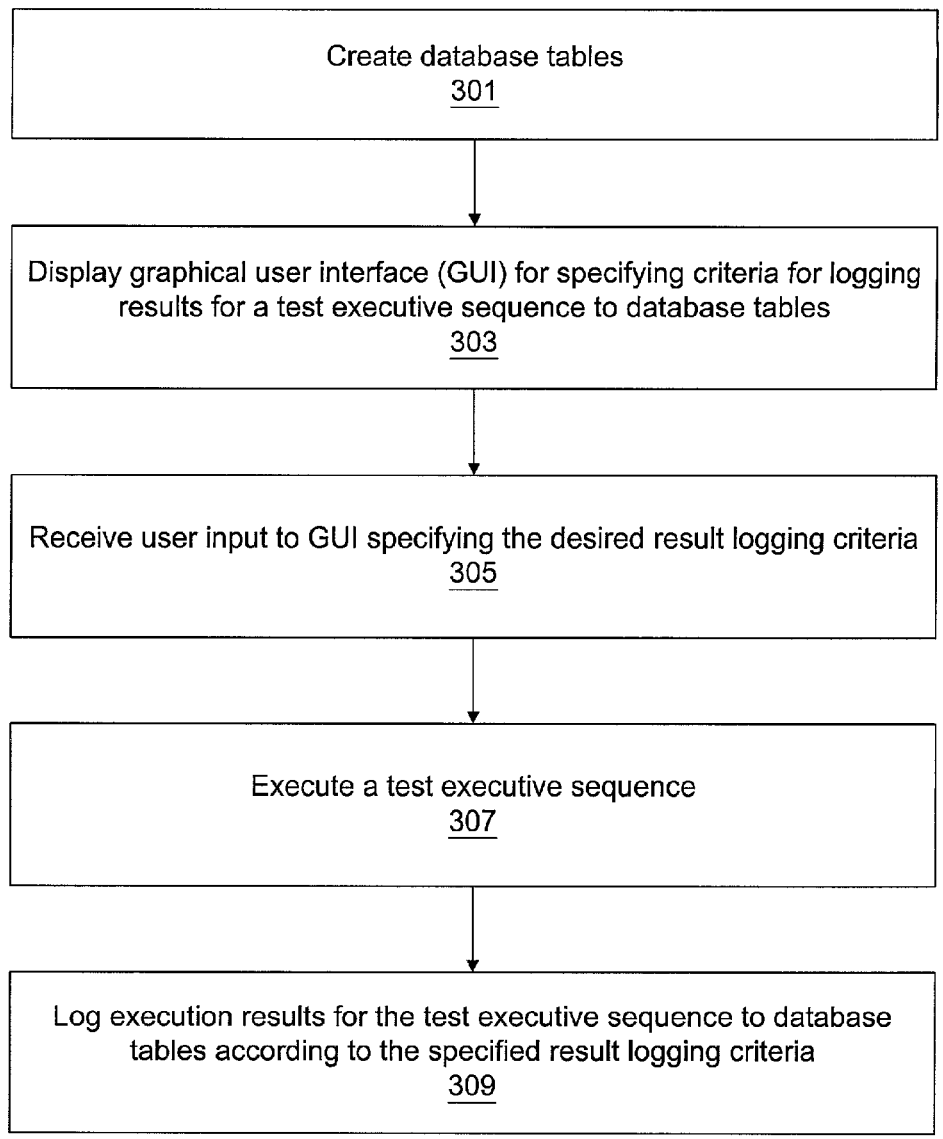
FIG. 6 is a flowchart diagram illustrating one embodiment of a method for logging results for a test executive sequence to a database.
Figure 7:
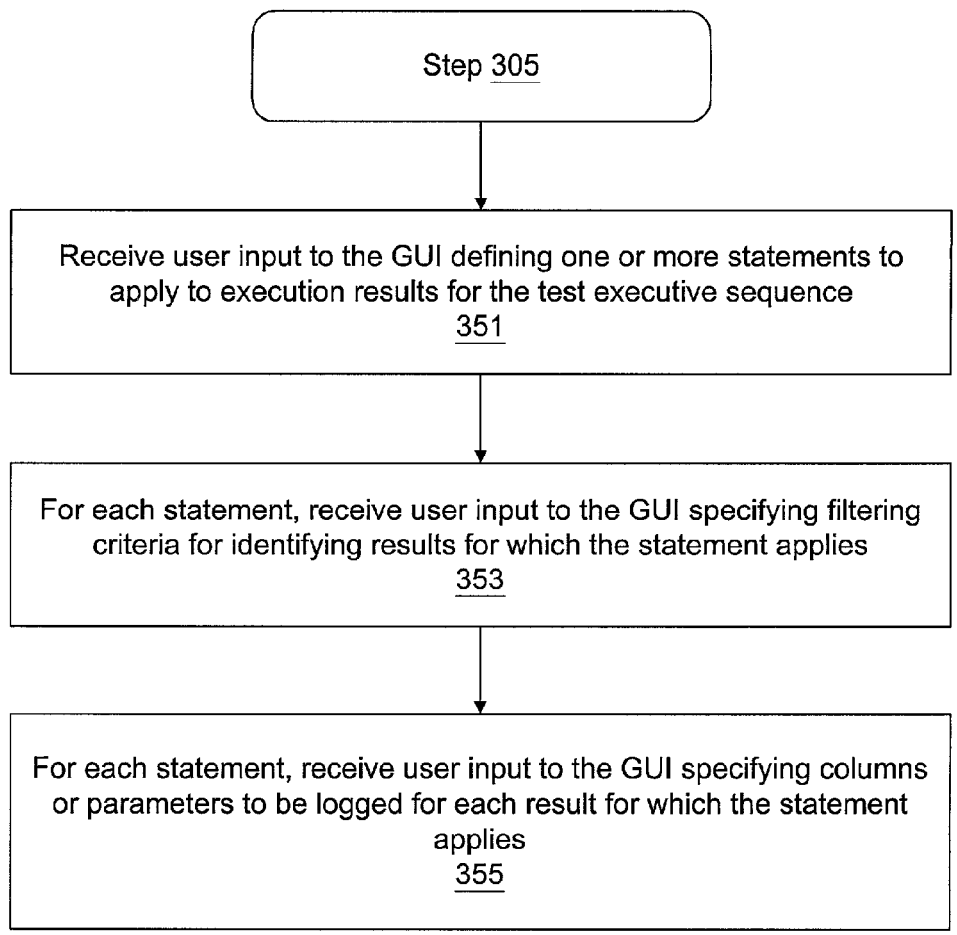
FIG. 7 is a flowchart diagram illustrating one embodiment of step 305 of FIG. 6, in which user input specifying desired result logging criteria is received to a graphical user interface (GUI)

FIGS. 6 and 7—Logging Sequence Results

FIG. 6 is a flowchart diagram illustrating one embodiment of a method for logging results for a test executive sequence to a database. It is noted that FIG. 6 represents an exemplary embodiment, and various alternative embodiments are contemplated. Also, the steps of FIG. 6 may be performed in various orders, and steps may be combined, added, or omitted, etc.

In step 301, one or more database tables may be created. The database tables may be associated with a database of any kind and may comprise one or more columns, such as are well known in the art. As described below, the database tables may be used to persistently store execution results for a test executive sequence. In one embodiment, default database tables may be created by the test executive software, e.g., at installation time, and it may be unnecessary to perform step 301. In another embodiment, the user may want to modify default tables and/or create new tables. The database tables may be created in any of various ways. For example, the user may execute a program or script, e.g., a SQL script, to create the tables, or the user may utilize an application to interactively create the tables (or modify existing tables). In one embodiment, a database viewer program is supplied with the test executive software, wherein the database viewer program allows the user to view contents of the database, as well as modify or create tables in the database.

In step 303, a graphical user interface (GUI) for specifying criteria for logging results for a test executive sequence to the database tables may be displayed. For example, the GUI may be displayed in response to the user requesting, e.g., via a menu item, to specify result logging criteria. In various embodiments, the GUI may be a GUI of any kind. For example, the GUI may comprise a dialog or window, such as used in window-based user interface systems. The dialog or window may comprise various user interface controls for receiving user input, such as check boxes, buttons, list boxes, etc. In the preferred embodiment, the GUI is specialized for receiving result logging criteria for a test executive sequence and enables the user to specify the criteria easily and efficiently. It is noted that the GUI may not necessarily be a single window, but may comprise multiple windows or tabs.

In step 305, user input specifying the desired result logging criteria may be received to the GUI. In various embodiments, any of various result logging criteria may be specifiable. For example, the user input may specify a mapping of the results for the test executive sequence to the database tables created in step 301. The user input may also specify criteria for limiting the amount of data logged to the database, e.g., by filtering the results that are logged in various ways. For example, the results may be filtered based on step types of the steps to which the results correspond, as described above. The results may also be filtered based on data types of the results. The results may also be filtered based on properties that must exist before the test executive logs the results. One particular embodiment of step 305 is described below with reference to FIG. 7. Also, an exemplary GUI for specifying the result logging criteria is described below.

In step 307, a test executive sequence may be executed. The test executive sequence may execute under control of test executive software to test one or more units under test (UUT). Executing the test executive sequence may comprise executing a plurality of test executive steps in the test executive sequence. As described above, various execution results for the test executive sequence may be collected as the sequence executes. There may be different classes of results. For example, there may be a result for the unit under test (UUT) and a result for every step in the test executive sequence. One or more of the steps in the test executive sequence may call a user-supplied or external code module, and for these steps, at least a portion of the result may be produced by execution of the user-supplied code module.

Each result may have multiple fields or sub-results. For example, a result for a step may have a field indicating the amount of time it took to execute the step, a field indicating the amount of time it took to execute an external code module called by the step, a field indicating the number of times the step was executed, a field indicating a result status for the step (e.g., Pass or Fail), a field indicating an error message for the step, etc. Also, a result for a step may have multiple sub-results corresponding to multiple measurements performed by the step. In one embodiment, for a result with multiple fields or sub-results, only a subset of the fields or sub-results may be logged to the database, depending on the specified result logging criteria.

Also, the results may include values that are not strictly determined by executing the test executive sequence. For example, a result for a step may have a field indicating the name of the step and/or a field indicating the name of the step type.

In step 309, the results for the test executive sequence may be logged to or stored in the database tables according to the specified result logging criteria. As described above, this may comprise logging only a subset or portion of the results to the database tables.

In one embodiment, the result logging criteria may be divided into multiple "statements". Each statement may comprise filtering criteria that specify a subset of the results for the test executive sequence, as well as criteria specifying how the subset of results should be mapped or logged to the database tables. Thus, the result logging performed by the test executive system may be viewed as a type of pattern matching, in that the entire result set is examined for results that match the filtering criteria of the statements. For the results to which each statement applies, those results are logged to the database or otherwise processed.

Thus, logging the results to the database according to the specified result logging criteria in step 309 may comprise applying the one or more statements to the results. For the result subset to which a particular statement applies, the statement may operate on the result subset in various ways. For example, in one embodiment, a mapping of results in the result subset to columns in the database tables may be specified, and the test executive system may automatically log the result subset to the database according to this mapping. In another embodiment, the user may specify a SQL command to apply to the result subset, such as a SQL INSERT command to insert the results in the result subset into the desired tables and columns. In another embodiment, the user may specify a stored procedure of the database to apply to the result subset.

The statements may be applied to the results at various times relative to execution of the test executive sequence. For example, in one embodiment, the statements may be applied after the sequence has finished execution, when all the results have been collected. Thus, no results may be logged until the sequence finishes execution. In another embodiment, the statements may be applied during execution of the sequence. For example, after a step executes and results for the step have been collected, the statements may be applied to the results for the step. Thus, step results may be logged in parallel with execution of the sequence.

FIG. 7 is a flowchart diagram illustrating one exemplary embodiment of step 305 of FIG. 6. FIG. 7 illustrates one representative use of statements. In step 351, user input to the GUI may be received to define one or more statements to apply to execution results for the test executive sequence. For example, the GUI may include a button or other means for creating a new statement, and step 305 may comprise creating the one or more statements.

In step 353, for each statement, user input to the GUI may be received to specify filtering criteria for identifying results (or a result subset) for which the statement applies, as described above.

In step 355, for each statement, user input to the GUI may be received to specify columns or parameters to be logged for each result for which the statement applies, i.e., each result in the result subset.

Example GUI—TestStand Test Executive Application

The remainder of this disclosure describes one particular implementation of the methods described above. An exemplary GUI for the TestStand test executive application from National Instruments Corp. is described. However, this description refers to various features specific to TestStand and is intended for illustrative purposes. Numerous alternative embodiments are contemplated.

The default process model relies on the automatic result collection capability of the TestStand engine to accumulate the raw data to log to a database for each UUT. The TestStand engine can collect the results of each step into a result list for an entire sequence automatically. The result list for a sequence contains the result of each step it runs and the result list of each subsequence call it makes. The default process model calls the main sequence in the client sequence file to test a UUT. Thus, the result list that the TestStand engine accumulates for the main sequence contains the raw data to log to a database for the UUT.

The Test UUTs and Single Pass entry points in the TestStand process models log the raw results to a database. The Test UUTs entry point logs results after each pass through the UUT loop.

The Configure>>Database Options menu item displays the Database Options dialog box where the user can set the following options:

Specify the data link to which TestStand logs results.
Specify the database schema that TestStand uses. A schema contains the statements, table definitions, and TestStand expressions to instruct TestStand how to log results to a database. TestStand includes a set of predefined schemas, at least one for each supported DBMS. The user can create new schemas that log results to tables the user defines.
Specify various filtering options to limit the amount of data that TestStand logs.

The user may use the Database Options dialog box to enable database logging and to define a data link and schema for the default process model to use. The user access the Database Options dialog box by selecting Configure>>Database Options. In the Database Options dialog box, the user can customize the logging of results to a database. The settings the user chooses in the Database Options dialog box apply to all executions that use the Test UUTs and Single Pass entry points.

When the user selects Configure>>Database Options, TestStand executes the Config Database Options entry point in the default process model. Thus, while the dialog box is active in the sequence editor, the Running message appears on the left side of the status bar. The Database Options dialog box contains the following tabs: Logging Options, Data Link, Schemas, Statements, and Columns/Parameters.

Logging Options Tab

Figure 8:
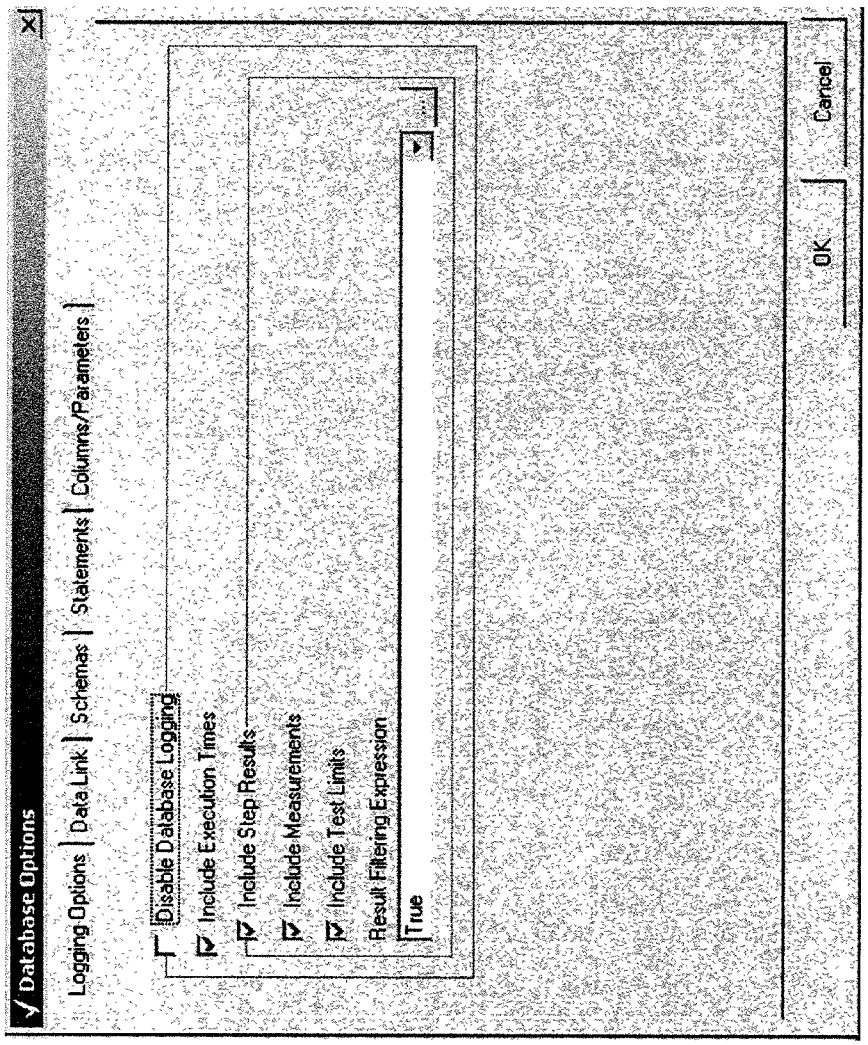
FIGS. 8–13 illustrate an exemplary GUI for the TestStand test executive application from National Instruments Corp., wherein the GUI is usable to specify database result logging criteria for a test executive sequence.

FIG. 8 shows the Logging Options tab of the Database Options dialog box. The Logging Options tab contains the following controls:

Disable Database Logging—The user enables this option if the user does not want TestStand to log data to a database.
Include Execution Times—The user enables this option if the user wants to log the time that each step module takes to execute. This is the time that the subsequence, Lab-VIEW VI, or C function takes to execute.
Include Step Results—The user enables this option if the user wants to log the results of each step. Disable this option if the user wants to include only information on each UUT that the user tests.
Include Measurements—The user enables this option if the user wants to log the measurement values that steps acquire. The default schemas recognizes specific step properties as containing values to log. These include properties such as Result.Numeric, Result.String, and Result.Measurement. For the Numeric Limit Test built-in step type, Result.Numeric contains the numeric measurement the step acquires. For the String Value Test built-in step type, Result.String contains the measurement value the step returns in string form. For the Multiple Numeric Limit step type, Result.Measurement[ ].Data contains the numeric measurements the step acquires.
Include Test Limits—The user enables this option if the user wants to log values that step types use as test limits. The default schemas recognize specific step properties as containing test limits. These properties include Limit.Low, Limit.High, Limit.String, and Comp. The Numeric Limit Test compares the measurement value it acquires against Limit.Low, Limit.High, or both, and uses Comp to select the type of comparison to make. The String Value Test compares the string it acquires against Limit.String and uses Comp to indicate whether to ignore the case in the comparison.

Result Filtering Expression—Specifies which step results appear in the database. The user does so by specifying an expression that the database logger evaluates for each step result. The database logger includes the step in the database if the expression evaluates to True. The user can use any subproperty in the Result property of the step, but the user must use Logging.StepResult in place of Step.Result. For example, if the user wants to include only failing steps in the database, the user sets the expression to Logging.StepResult.Status="Failed". The user can use the menu ring to the right of the control to select pre-defined expressions for all steps, only failing steps, or only passing steps. The user can open the Expression Browser to build the expression by selecting the Browse button.

Data Link Tab

Figure 9:
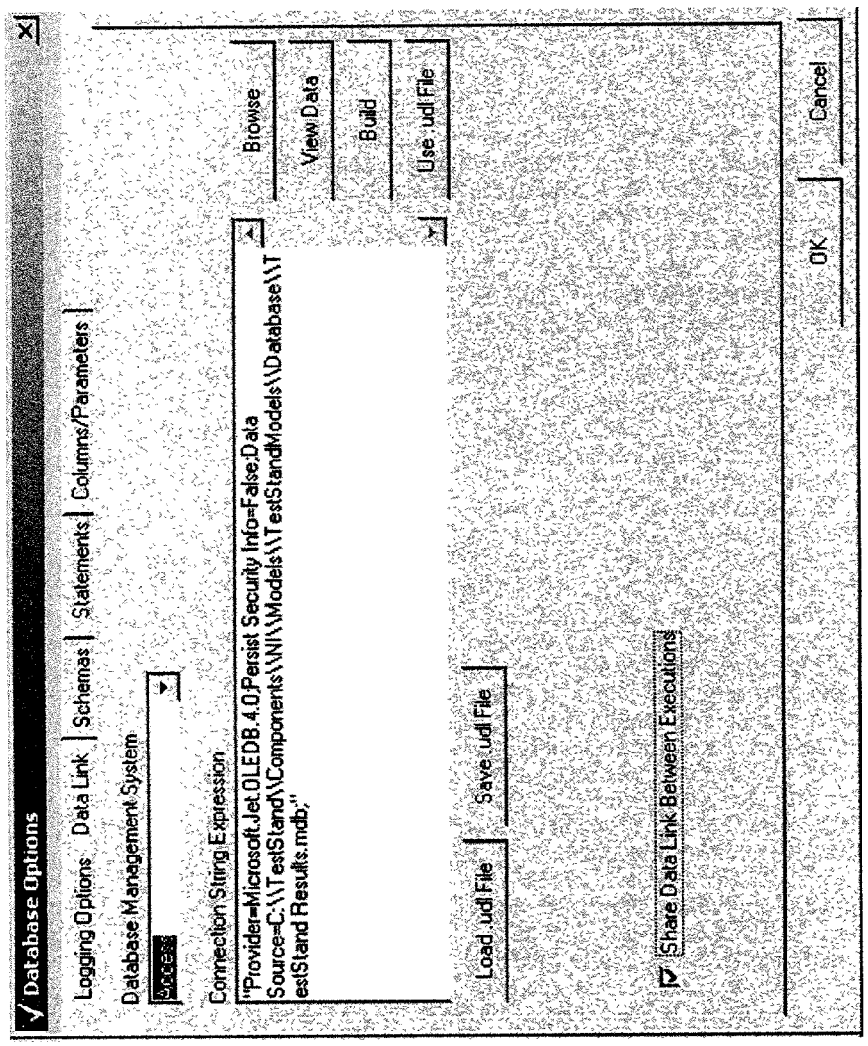

The Data Link tab specifies the data link information that the process model requires to connect to a database and to log data. FIG. 9 shows the Data Link tab of the Database Options dialog box. The Data Link tab contains the following controls:

Database Management System—Specifies the name of the DBMS to which the user wants to log data. Because of the different requirements of each DBMS, TestStand might log data to each DBMS differently. TestStand supports Oracle, Microsoft Access, and Microsoft SQL Server by default. The user can use the menu ring to the right of the control to select one of these names.

Connection String Expression—Specifies the connection string expression that TestStand uses to open a data source to log results to. The Connection String control requires a string expression, that the TestStand process model evaluates at run time. The expression can be a literal value or a string the user builds using variables or properties. If the value is a string literal, the user must encapsulate the string value with quotes (""). The user can update the contents of the Connection String control in any of the following ways:

Browse—Edits a connection string expression in an Expression Browser dialog box.

View—Launches the Database Viewer application and opens the connection string within the viewer.

Build—Allows the user to construct the connection string using the Data Link Properties dialog box.

Use .udl File—Allows the user to select a Microsoft Data Link (.udl) filename as the connection string. The text in the data link file specifies the connection string. When the user selects a Microsoft Data Link file, TestStand updates the Connection String control with the name of the file, as in the following example:

"FILE NAME=C:\\Program Files\\Common Files\\System\\OLE DB\\Data Links\\Access.udl"

Load .udl File—Allows the user to select a Microsoft Data Link (.udl) filename and import the connection string from the file to the control.

Save .udl File—Allows the user to specify a Microsoft Data Link (.udl) filename and export the connection string from the control to the file.

Schemas Tab

Figure 10:
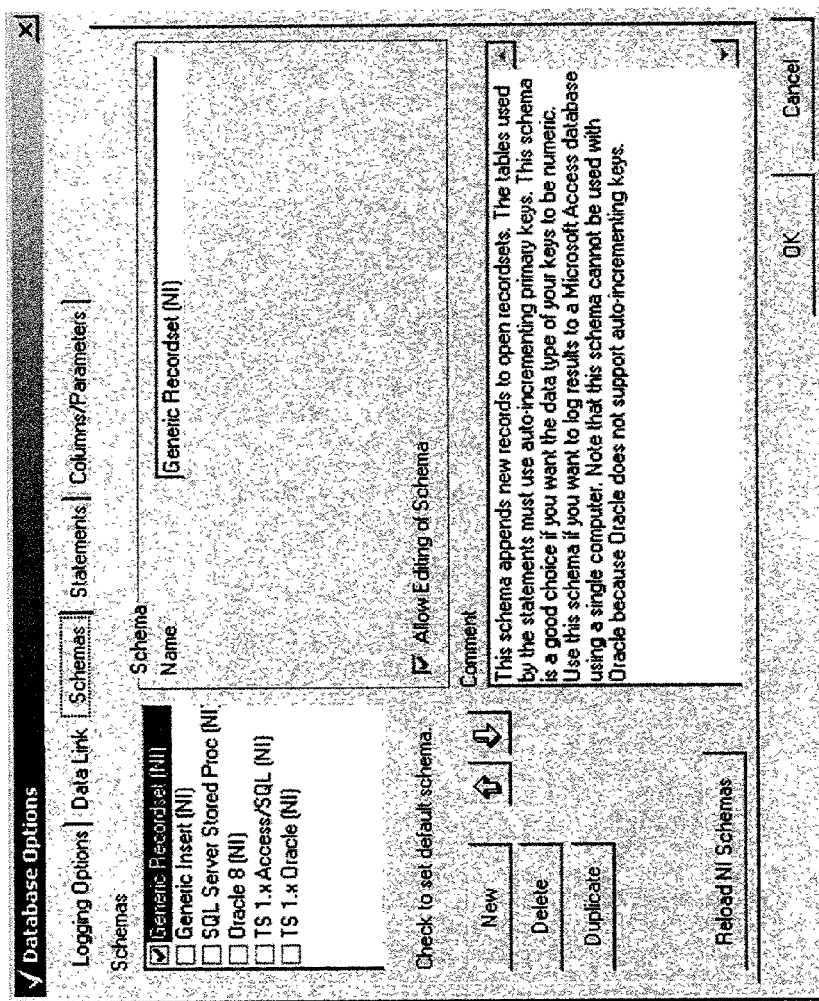

The Schemas tab specifies the database schemas available and the default schema that the TestStand process model uses. A schema defines how TestStand logs results to a database. A schema comprises a list of statements, and each statement comprises a list of columns. FIG. 10 shows the Schemas tab of the Database Options dialog box. The Schemas tab contains the following controls:

Schemas—Contains a list of schemas. When the user select a schema, the Schema section displays the settings for the selected item. The user can specify the default schema that the TestStand process model uses by enabling the checkbox for the selected schema. The user can use the Duplicate and Delete buttons to copy and delete items from the list. The user can use the up and down arrow buttons to control the order of the items in the list.

Reload NI Schemas—Reloads all the default schemas that TestStand installs.

Name—Specifies the name of the schema.

Allow Editing of Schema—Enables controls that edit the schema.

Comment—Specifies a text description or comment for the schema.

Statements Tab

Figure 11:
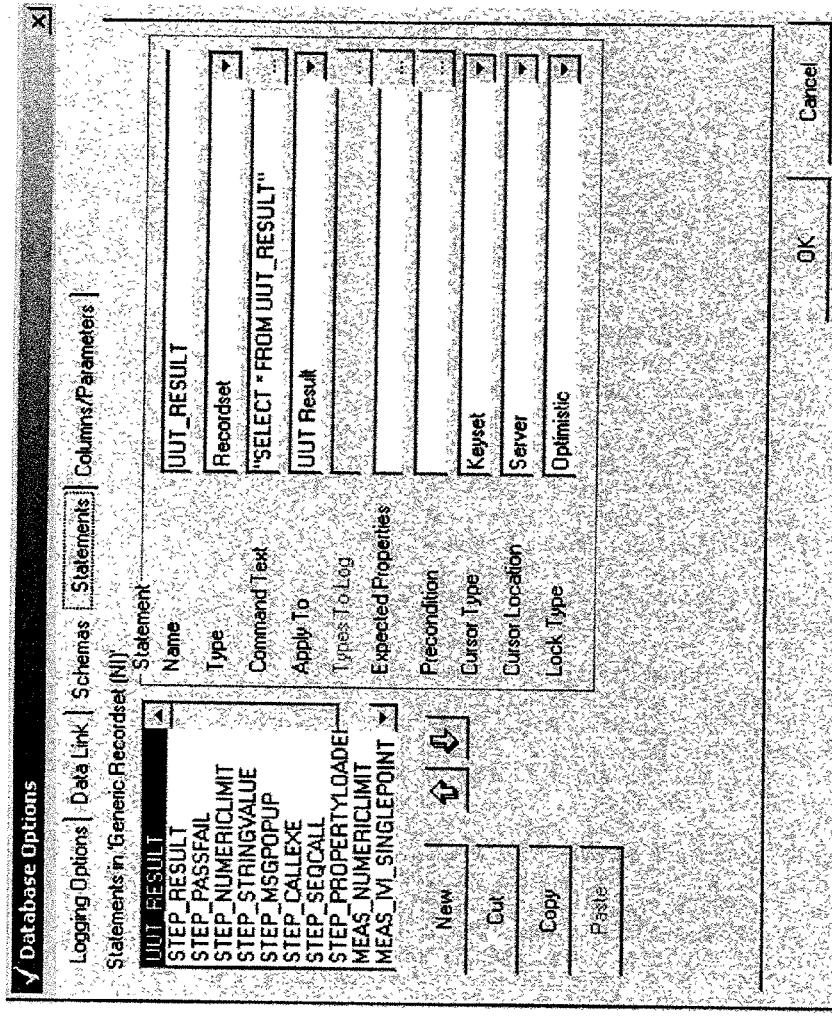

The Statements tab defines the data that TestStand logs. Statements define the type of results the schema operates on and the conditions that must be true before TestStand logs the results. Statements also define the database action to perform. In addition, statements specify what database columns or parameters to log and the TestStand expressions to evaluate to determine the column or parameter values. FIG. 11 shows the Statements tab of the Database Options dialog box. The Statements tab contains the following controls:

Statements—Contains a list of statements for the schema specified on the Schemas tab. When the user selects a statement, the Statement section displays the settings for the selected item. The user can use the New, Cut, Copy and Paste buttons to edit the contents of the list control. The user can use the up and down arrow buttons to control the order of the items in the list.

Name—Edits the name of the statement. Typically, the statement name has the same name as the database table to which it logs data.

Type—Specifies the type of statement. The user can select one of the following options:

Recordset—Specifies that the statement returns a recordset. For the columns defined on the Columns tab, TestStand inserts a new record into the recordset. The user would typically use an SQL SELECT command that returns a recordset with this option.

Command—Specifies that TestStand executes a command for each result that applies to the statement. For each column defined on the Columns tab, TestStand creates a parameter. This type of statement is called a parameterized statement. For input parameters, TestStand assigns the column value to the parameter before executing the statement. For output parameters, TestStand retrieves the parameter value after executing the statement. The user would typically use an SQL INSERT command that contains the question mark "?" keyword to specify the parameters.

Stored Procedure—Specifies that TestStand executes a stored procedure for each result that applies to the statement. For each column defined on the Columns tab, TestStand creates a parameter. For input parameters, TestStand assigns the column value to the parameter before executing the statement. For output parameters, TestStand retrieves the parameter value after executing the statement. Stored procedures also can return a value in addition to output parameters.

Command Text—Specifies the text of a command that the statement issues against the data link. This is typically an SQL SELECT or SQL INSERT statement, but it can be any type of command statement that the database provider recognizes, including stored procedure calls.

Apply To—Specifies the class of results on which the statement operates. The user can choose one of the following options from the ring control:

UUT Result—TestStand applies the statement once per UUT.

Step Result—TestStand applies the statement to each step result.

Step Result Subproperty—TestStand applies the statement to each subproperty of a step result.

Types to Log—Specifies the data types of results for which the statement applies. For step results, the type must be the name of a TestStand step type. For step result subproperties, the type must be the name of a TestStand data type. This option does not apply to a UUT Result. Leave the control empty to instruct TestStand to not require any type matching.

Expected Properties—Specifies the properties that must exist before TestStand applies the statement to a particular result. Leave the control empty to instruct TestStand not to require any expected properties.

Precondition—Specifies an expression that must evaluate to True before TestStand applies the statement to a particular result. Leave the control empty to instruct TestStand to not apply a precondition.

Cursor Type—Specifies the type of server or client cursor for the statement. The user can choose one of the following options from the ring control:

Unspecified—Do not specify a cursor type.

Dynamic—Additions, changes, and deletions by other users are visible, and all types of movement through the set of records are allowed.

Static—Additions, changes, and deletions by other users are not visible.

Forward Only—Identical to a static cursor except that the user can only scroll forward through records. This option improves performance when the user wants to make a single pass through a set of records.

Keyset—Similar to dynamic cursor, except that the user cannot see records that other users add. Records that other users delete are inaccessible from the user's set of records. Data changes by other users within records are visible.

Cursor Location—Specifies where the data source maintains cursors for a connection. The user can choose one of the following options from the ring control:

Server—Uses cursors the data provider supplies. These cursors are sometimes very flexible and allow for additional sensitivity to reflect changes that other users make to the actual data.

Client—Uses client-side cursors that a local cursor library supplies. Local cursor engines often allow many features that driver supplied cursors do not.

Lock Type—Specifies when the data source locks a record. The user can choose one of the following options from the ring control.

Unspecified—Do not specify a lock type.

Read Only—The user cannot alter the data in a record.

Pessimistic—The provider does what is necessary to ensure successful editing of the records, usually by locking records at the data source immediately upon editing.

Optimistic—The provider locks records only when the user send the data back to the database.

Batch Optimistic—Required for batch updates.

Columns/Parameters Tab

Figure 12:
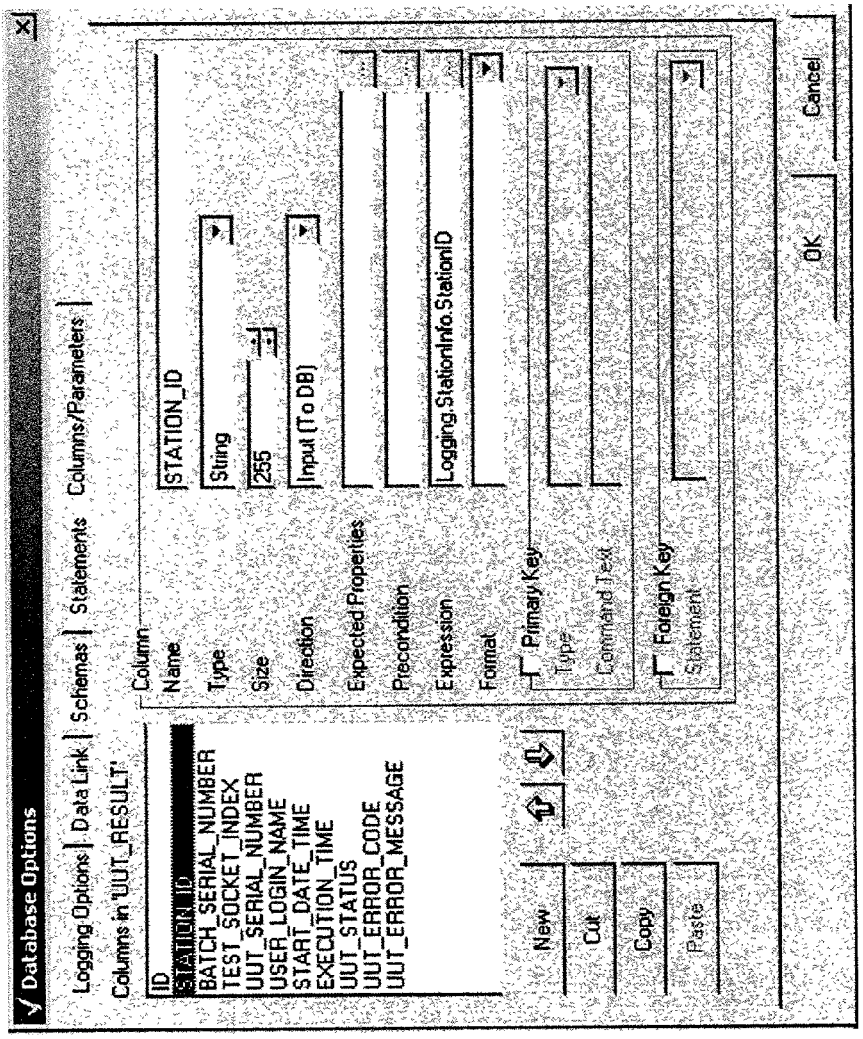

The Columns/Parameters tab specifies the columns or parameters that TestStand logs for each result for which the statement applies. For recordset statements, TestStand expects the recordset to return the specified column names, and the order of the columns in the list control is arbitrary. For command statements, TestStand creates a parameter for each item in the list. Depending on whether the parameter is an input or an output operation, TestStand will set or get the value, respectively. The name of the parameter is arbitrary, but the parameter list order must match the required parameters for the statement. FIG. 12 shows the Column/Parameters tab of the Database Options dialog box. The Columns/Parameters tab contains the following controls:

Columns/Parameters—Contains a list of columns or parameters for the statement specified on the Statements tab. When the user selects a column or parameter, the Column/Parameter section displays the settings for the selected item. For parameterized statements, the order of the parameters in the list must correspond to the required parameters for the statement. The user can use the New, Cut, Copy, and Paste buttons to edit the elements of the list control. The user can use the up and down arrow buttons to control the order of the items in the list.

Name—Edits the name of the column or parameter. For recordset statements, the name must match a column in the returned recordset. For parameterized statements, the name is arbitrary.

Type—Specifies the data type of the column or parameter value. The user can choose one of the following options from the ring control: Small Integer, Integer, Float, Double Precision, String, Boolean, Binary, or Date/Time, GUID.

Size—Specifies the maximum number of bytes that TestStand writes to or reads from a column or parameter. If the column does not have a size limitation, the user can specify 0 to instruct TestStand to write or read the entire value.

Direction—Specifies whether the column or parameter is an input or output value. The user can select one of the following options:

Input—Indicates that TestStand writes the column value or parameter to the database.

Output—Indicates that TestStand retrieves the column value or parameter from the database.

Input/Output—Indicates that TestStand writes and retrieves the column value or parameter.

Return Value—Indicates that TestStand retrieves the parameter value as a return value from the database.

Expected Properties—Specifies the properties that must exist before TestStand assigns or retrieves a value for the column or parameter. Leave the control empty to instruct TestStand to not require any expected properties.

Precondition—Specifies an expression that must evaluate to True before TestStand assigns or retrieves a value for the column or parameter. Leave the control empty to instruct TestStand to not apply a precondition.

Expression—Specifies an expression that the column or parameter evaluates to obtain the input value to log or the variable property location to store the output value retrieved.

Format—Specifies how to convert a string value when assigning a string to a column. The user usually use this control when writing to a column of type Date/Time or Currency.

PrimaryKey—Enable this control to specify that the database column is a primary key. The values in a primary key column must be unique.

Type—Specifies how TestStand obtains a unique primary key value to assign to a new record. The user can choose one of the following options from the ring control:

Auto Generated/Counter—TestStand requests the value that the database assigns to the new record.

Store GUID Value—TestStand generates a unique string value. The database column type must be GUID or String and must be at least 36 bytes for string.

Get Value from Statement—TestStand obtains the value from the statement the user specifies.

Command Text—Specifies the text of a command that the statement issues against the data link to obtain the primary key value. The user uses this control only when the user selects Get Value from Statement in the type ring. The statement must return the value in a recordset that contains a single column with one record.

Foreign Key—The user enables this control to specify that the database column is a foreign key. A foreign key is a column that references a primary key in a table.

Statement—Select the statement that contains the primary key column in which the foreign key references. TestStand automatically assigns the primary key value to the column or parameter.

Logging Property in the Sequence Context

Figure 13:
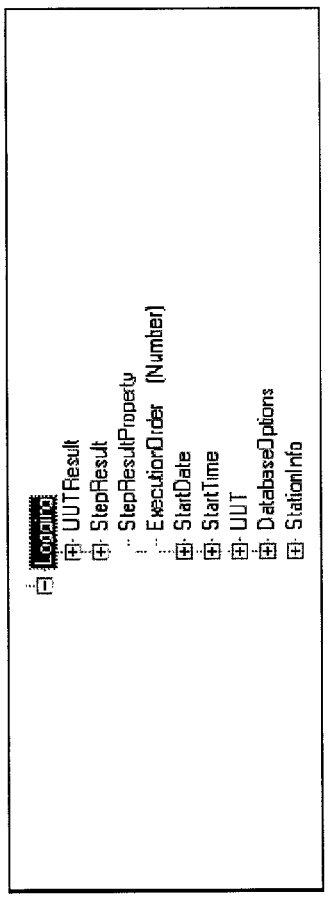

When the database logger starts, it creates a temporary property name Logging in the sequence context in which the database logger evaluates expressions. The Logging property contains subproperties that provide information about database settings, process model data structures, and the results that the logger processes. As logging processes the result list, the logger updates subproperties of Logging to refer to the UUT result, step result, and the step result subproperty the logger is processing. The user can reference the Logging subproperties in the precondition and value expressions that the user specifies for statements and column values. FIG. 13 shows the subproperties for the Logging property.

The following describes each subproperty of the Logging property:

UUTesult—Contains the UUT result that the logger is processing. If the logger is processing a step or a subproperty, this property holds the UUT result that contains the step result or subproperty.

StepResult—Contains the step result that the logger is processing. If the logger is processing a subproperty, this property holds the step result that contains the subproperty. If the logger is processing a UUT result, this property contains the result of the sequence call in the process model that calls the MainSequence in the client file.

StepResultProperty—Contains the subproperty of the step result that the logger is processing. If the logger is not processing a subproperty, this property does not exist.

ExecutionOrder—Contains a numeric value that the logger increments after it processes each step result.

StartDate—Specifies the date on which the UUT test began. This property is an instance of the DateDetails custom data type.

StartTime—Specifies the time at which the UUT test began. This property is an instance of the TimeDetails custom data type.

UUT—Specifies the serial number, test socket index, and other information about the unit under test. This property is an instance of the UUT custom data type.

DatabaseOptions—Contains the process model database settings the user configures in the Database Options dialog box. This property is an instance of the DatabaseOptions custom data type.

StationInfo—Specifies the station ID and the login name. This property is an instance of the StationInfo custom data type.

The TestStand process model files define the structure of the DatabaseOptions, DateDetails, TimeDetails, UUT, and StationInfo custom data types that the logging properties use.

TestStand Database Result Tables

This section describes the default table schemas that TestStand uses. The default TestStand database schema require the following tables in the user's database:

UUT_RESULT
STEP_RESULT
STEP_SEQCALL
STEP_PASSFAIL
STEP_CALLEXE
STEP_MSGPOPUP
STEP_PROPERTYLOADER
STEP_STRINGVALUE
MEAS_NUMERICLIMIT
MEAS_IVI_WAVE
MEAS_IVI_WAVEPAIR
MEAS_IVI_SINGLEPOINT

The UUT_RESULT table contains information on each UUT that TestStand tests. The STEP_RESULT table contains information on each step that TestStand executes while testing each UUT. The other table names with the prefix "STEP" contain information for each specific step type. The table names with the prefix "MEAS" contain information on sub-results that TestStand logs for a step type.

Each table contains a primary key column ID. The data type of the column is Number, String, or GUID, depending on the selected schema. Each table might contain foreign key columns. The data types of the columns must match the primary key that the data types reference.

FIG. 14 lists the name, data type, and description of each column in the UUT_RESULT table.

FIGS. 15A and 15B lists the name, data type, and description of each column in the STEP_RESULT table.

FIG. 16 lists the name, data type, and description of each column in the STEP_CALLEXE table. The default TestStand schemas log subproperties of the Call Executable step into this table.

FIG. 17 lists the name, data type, and description of each column in the STEP_MSGPOPUP table. The default TestStand schemas log subproperties of the Message Popup step into this table.

FIG. 18 lists the name, data type, and description of each column in the STEP_PASSFAIL table. The default TestStand schema logs subproperties of the Pass/Fail Test step into this table.

FIG. 19 lists the name, data type, and description of each column in the STEP_STRINGVALUE table. The default TestStand schema logs subproperties of the String Value Test step into this table.

FIG. 20 lists the name, data type, and description of each column in the STEP_PROPERTYLOADER table. The default TestStand schema logs subproperties of the Property Loader step into this table.

FIG. 21 lists the name, data type, and description of each column in the STEP_SEQCALL table. The default TestStand schema logs subproperties of the Sequence Call step into this table.

FIG. 22 lists the name, data type, and description of each column in the MEAS_NUMERICLIMIT table. The default TestStand schema logs the measurements of the Numeric Limit Test step and the Multiple Numeric Limit Test step into this table.

FIG. 23 lists the name, data type, and description of each column in the MEAS_SINGLEPOINT table. The default TestStand schema logs the measurements of the IVI steps into this table.

FIG. 24 lists the name, data type, and description of each column in the MEAS_WAVE table. The default TestStand schema logs the measurements of the IVI steps into this table.

FIG. 25 lists the name, data type, and description of each column in the MEAS_WAVEPAIR table. The default TestStand schema logs the measurements of the IVI steps into this table.

The default TestStand database schemas assume that result tables conform to the above table definitions. If the user wants to modify the table schema, the user must alter the tables in the user's database and create a new schema using the Database Options dialog box.

Database Viewer

Figure 26:
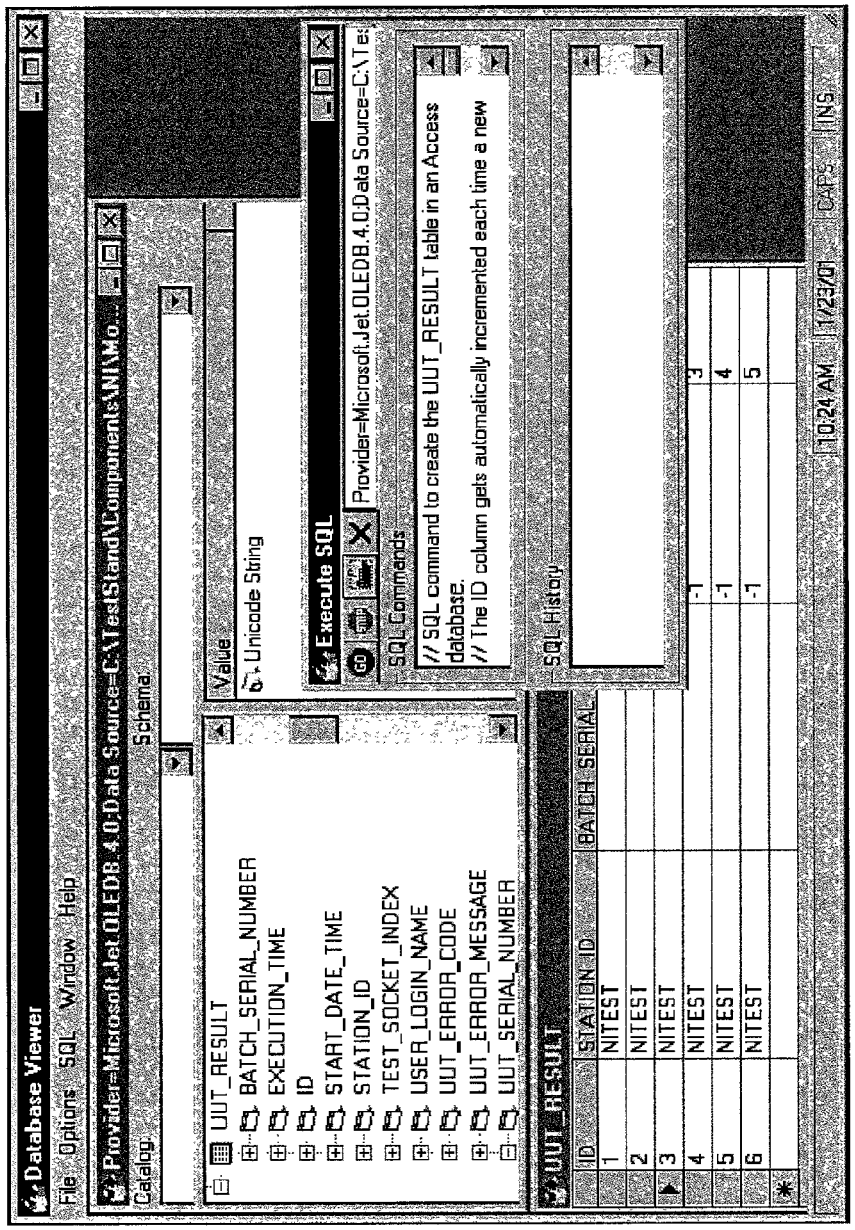
FIG. 26 illustrates a database viewer application provided with the TestStand test executive application.

TestStand includes the Database Viewer application for viewing data in a database, editing table information, and executing SQL commands. FIG. 26 shows the Database Viewer main window. The Database Viewer displays the following three types of windows:

Data Link Window—Contains a tree view of the tables that are defined for the data link. The list view displays the contents of the currently selected node in the tree view. The Catalog control lists the available catalogs defined by the DBMS. The Schema control lists the available schemas defined by the DBMS. The user can display a context menu by right-clicking on the window. The items in the context menu vary depending on whether the user right-click on a node in the tree view, on an entry in the list view, or on the background area. The context menu can contain the following items:

View Data—Opens in the Database Viewer a new Data View window with the contents of the table. The user can access this command on a table node in the tree view of the Data Link window.

Add Table—Creates a new table in the DBMS.

Drop Table—Deletes a table from the DBMS.

Add Column—Adds a new column to a table.

Drop Column—Deletes a column from a table.

Execute SQL Window—Contains a SQL Commands control and a SQL History control. The user can enter SQL commands in the SQL Commands control and execute its contents by selecting the Go icon button. The user can load SQL script files by clicking on the Open File icon button. Use the Clear icon button to delete the contents from the SQL Commands control.

Data View Window—Contains a grid display of the data returned from a SQL command. Database Viewer automatically opens a new Data View window when the user uses the View Data context menu command on a table node in the tree view of the Data Link window or when the user issues a SQL command that returns a recordset. The status bar at the bottom of the main window displays the status for executing commands.

The Database Viewer menu bar contains commands that apply to all windows and commands that apply to specific windows. The following describes the menu items in the menu bar:

The File menu contains the following commands:

Open—Opens a database file such as a Microsoft Access database file (.mdb) or opens a data link by selecting a Microsoft Data Link (.udl) filename.

New Data Link—Opens a data link by constructing a connection string using the Data Link Properties dialog box.

New Execute SQL Window—Opens an Execute SQL window. This command is available only after the user open a data link.

Close—Closes an open window.

Exit—Closes the current viewer session. The application closes all open windows automatically. Just below the Exit command on the File menu, TestStand provides a list of the most recently used data link files.

The Options menu can contain the following items.

Edit Data—Allows the user to edit the contents of a table. This control applies to the Data View window.

Viewer Options—Displays the Viewer Options dialog box which allows the user to customize the behavior of the application.

Database Options—Displays the Database Options dialog box.

The SQL menu is available only when an Execute SQL window is active. The SQL menu has the following commands:

Execute—Executes SQL commands in the SQL Commands control in the active Execute SQL window.

Stop—Stops the execution of SQL commands.

Load From File—Imports the contents of a text file into the SQL Commands control in the active Execute SQL window.

Clear—Deletes the contents from the SQL Commands control in the active Execute SQL window.

The Windows menu has the following commands:

Refresh—Updates the contents of a Data Link View window or a Data View window.

Cascade—Arranges all open windows so that each title bar is visible.

Tile—Arranges all open windows in smaller sizes to fit next to each other.

Arrange Icons—Arranges all minimized windows at the bottom of the main window.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for logging results for a test executive sequence to a database, the method comprising:

displaying a graphical user interface (GUI) for specifying criteria for logging results for the test executive sequence to the database;

receiving user input to the GUI specifying desired result logging criteria;

executing the test executive sequence, wherein said executing the test executive sequence includes executing a plurality of steps in the test executive sequence, wherein each of the steps executes to produce one or more results, wherein the steps include a first step that calls a user-supplied code module, wherein the one or more results produced by the first step include one or more results produced by execution of the user-supplied code module; and logging the results of the steps to the database according to the specified result logging criteria.

2. The method of claim 1,
wherein the test executive sequence executes under control of test executive software to test one or more units under test (UUTs).

3. The method of claim 1,
wherein the results produced by execution of the steps comprise one or more test results for a unit under test (UUT).

4. The method of claim 1,
wherein said receiving user input to the GUI specifying desired result logging criteria comprises receiving user input specifying a mapping of results for the test executive sequence to one or more database tables;
wherein said logging the results to the database comprises logging the results to the one or more database tables.

5. The method of claim 4, further comprising:
creating the one or more database tables.

6. The method of claim 1,
wherein said receiving user input to the GUI specifying desired result logging criteria comprises receiving user input to the GUI specifying criteria for limiting the amount of data logged to the database.

7. The method of claim 6,
wherein the criteria for limiting the amount of data logged to the database is based on one or more of:
a data type; or
a step type.

8. The method of claim 1,
wherein said receiving user input to the GUI specifying desired result logging criteria comprises receiving user input to the GUI specifying a subset of the results for the test executive sequence to log to the database.

9. The method of claim 1,
wherein the steps comprise steps of different step types;
wherein said receiving user input to the GUI specifying desired result logging criteria comprises receiving user input to the GUI specifying different result logging criteria for different step types;
wherein said logging the results to the database according to the specified result logging criteria comprises logging different results to the database for steps of different step types.

10. The method of claim 1,
wherein one or more of the results have an associated property;
wherein said receiving user input to the GUI specifying desired result logging criteria comprises receiving user input to the GUI specifying that a first property must exist for a first result in order for the first result to be logged to the database.

11. The method of claim 1,
wherein said receiving user input to the GUI specifying desired result logging criteria comprises receiving user input specifying a precondition expression for one or more of the steps;
wherein, for each step having a precondition expression, results of the step are logged to the database only if the precondition expression for the step evaluates to True.

12. The method of claim 1,
wherein said receiving user input to the GUI specifying desired result logging criteria comprises receiving user input to the GUI defining one or more statements to apply to results for the test executive sequence;
wherein said logging the results to the database according to the specified result logging criteria comprises applying the one or more statements to the results.

13. The method of claim 12, wherein said receiving user input to the GUI specifying desired result logging criteria further comprises:
for each statement, receiving user input to the GUI specifying filtering criteria for identifying results for which the statement applies; and
for each statement, receiving user input to the GUI specifying columns or parameters to be logged for each result for which the statement applies.

14. The method of claim 13,
wherein said receiving user input to the GUI specifying columns or parameters to be logged for each result for which the statement applies comprises receiving user input to the GUI comprises receiving user input specifying a mapping from results to columns.

15. A method for logging results for a test executive sequence to a database, the method comprising:
displaying a graphical user interface (GUI) for specifying criteria for logging results for the test executive sequence to the database;
receiving user input to the GUI specifying desired result logging criteria, wherein said receiving user input comprises receiving user input defining one or more statements to apply to results for the test executive sequence;
executing the test executive sequence, wherein said executing the test executive sequence produces one or more results;
applying the one or more statements to the one or more results for the test executive sequence, wherein said applying the one or more statements to the one or more results operates to log at least a subset of the results to the database.

16. The method of claim 15,
wherein said receiving user input to the GUI specifying desired result logging criteria further comprises receiving user input specifying filtering criteria for filtering the results to which to apply the one or more statements;
wherein, in applying the one or more statements to the one or more results for the test executive sequence, the one or more statements are applied only to results meeting the specified filtering criteria.

17. The method of claim 15, wherein said receiving user input to the GUI specifying desired result logging criteria further comprises:
for a first statement, receiving user input to the GUI specifying a first class of results to which to apply the statement;
wherein said applying the one or more statements to the one or more results for the test executive sequence comprises applying the first statement only to results of the first class.

18. A memory medium for logging results for a test executive sequence to a database, the memory medium comprising program instructions executable to:
display a graphical user interface (GUI) for specifying criteria for logging results for the test executive sequence to the database;
receive user input to the GUI specifying desired result logging criteria;

execute the test executive sequence, wherein said executing the test executive sequence includes executing a plurality of steps in the test executive sequence, wherein each of the steps executes to produce one or more results, wherein the steps include a first step that calls a user-supplied code module, wherein the one or more results produced by the first step include one or more results produced by execution of the user-supplied code module; and log the results of the steps to the database according to the specified result logging criteria.

19. The memory medium of claim 18,
wherein the results produced by execution of the steps comprise one or more test results for a unit under test (UUT).

20. The memory medium of claim 18,
wherein said receiving user input to the GUI specifying desired result logging criteria comprises receiving user input specifying a mapping of results for the test executive sequence to one or more database tables;
wherein said logging the results to the database comprises logging the results to the one or more database tables.

21. The memory medium of claim 18,
wherein said receiving user input to the GUI specifying desired result logging criteria comprises receiving user input to the GUI specifying criteria for limiting the amount of data logged to the database.

22. The memory medium of claim 18,
wherein said receiving user input to the GUI specifying desired result logging criteria comprises receiving user input to the GUI specifying a subset of the results for the test executive sequence to log to the database.

23. The memory medium of claim 18,
wherein the steps comprise steps of different step types;
wherein said receiving user input to the GUI specifying desired result logging criteria comprises receiving user input to the GUI specifying different result logging criteria for different step types;
wherein said logging the results to the database according to the specified result logging criteria comprises logging different results to the database for steps of different step types.

24. The memory medium of claim 18,
wherein said receiving user input to the GUI specifying desired result logging criteria comprises receiving user input to the GUI defining one or more statements to apply to results for the test executive sequence;
wherein said logging the results to the database according to the specified result logging criteria comprises applying the one or more statements to the results.

25. The memory medium of claim 24, wherein said receiving user input to the GUI specifying desired result logging criteria further comprises: for each statement, receiving user input to the GUI specifying filtering criteria for identifying results for which the statement applies; and for each statement, receiving user input to the GUI specifying columns or
parameters to be logged for each result for which the statement applies.

26. The memory medium of claim 25,
wherein said receiving user input to the GUI specifying columns or parameters to be logged for each result for which the statement applies comprises receiving user input to the GUI comprises receiving user input specifying a mapping from results to columns.

27. A memory medium for logging results for a test executive sequence to a database, the memory medium comprising program instructions executable to:
display a graphical user interface (GUI) for specifying criteria for logging results for the test executive sequence to the database;
receive user input to the GUI specifying desired result logging criteria, wherein said receiving user input comprises receiving user input defining one or more statements to apply to results for the test executive sequence;
execute the test executive sequence, wherein said executing the test executive sequence produces one or more results;
apply the one or more statements to the one or more results for the test executive sequence, wherein said applying the one or more statements to the one or more results operates to log at least a subset of the results to the database.

28. The memory medium of claim 27,
wherein said receiving user input to the GUI specifying desired result logging criteria further comprises receiving user input specifying filtering criteria for filtering the results to which to apply the one or more statements;
wherein, in applying the one or more statements to the one or more results for the test executive sequence, the one or more statements are applied only to results meeting the specified filtering criteria.

29. The memory medium of claim 27, wherein said receiving user input to the GUI specifying desired result logging criteria further comprises:
for a first statement, receiving user input to the GUI specifying a first class of results to which to apply the statement;
wherein said applying the one or more statements to the one or more results for the test executive sequence comprises applying the first statement only to results of the first class.

30. A system comprising:
a processor;
a memory storing program instructions;
wherein the processor is operable to execute the program instructions to:
display a graphical user interface (GUI) for specifying criteria for logging results for a test executive sequence to a database;
receive user input to the GUI specifying desired result logging criteria;
execute the test executive sequence, wherein said executing the test executive sequence includes executing a plurality of steps in the test executive sequence, wherein each of the steps executes to produce one or more results, wherein the steps include a first step that calls a user-supplied code module, wherein the one or more results produced by the first step include one or more results produced by execution of the user-supplied code module; and
log the results of the steps to the database according to the specified result logging criteria.

31. The system of claim 30,
wherein the results produced by execution of the steps comprise one or more test results for a unit under test (UUT).

32. The system of claim 30,
wherein said receiving user input to the GUI specifying desired result logging criteria comprises receiving user input specifying a mapping of results for the test executive sequence to one or more database tables;

wherein said logging the results to the database comprises logging the results to the one or more database tables.

33. The system of claim 30, wherein said receiving user input to the GUI specifying desired result logging criteria comprises receiving user input to the GUI specifying criteria for limiting the amount of data logged to the database.

34. The system of claim 30, wherein said receiving user input to the GUI specifying desired result logging criteria comprises receiving user input to the GUI specifying a subset of the results for the test executive sequence to log to the database.

35. The system of claim 30, wherein the steps comprise steps of different step types;

wherein said receiving user input to the GUI specifying desired result logging criteria comprises receiving user input to the GUI specifying different result logging criteria for different step types;

wherein said logging the results to the database according to the specified result logging criteria comprises logging different results to the database for steps of different step types.

36. The system of claim 30, wherein said receiving user input to the GUI specifying desired result logging criteria comprises receiving user input to the GUI defining one or more statements to apply to results for the test executive sequence;

wherein said logging the results to the database according to the specified result logging criteria comprises applying the one or more statements to the results.

* * * * *